US012356433B2

(12) United States Patent
Obata et al.

(10) Patent No.: US 12,356,433 B2
(45) Date of Patent: Jul. 8, 2025

(54) WIRELESS COMMUNICATION SYSTEM, CONTROL DEVICE, AND COMPUTER PROGRAM PRODUCT

(71) Applicant: KABUSHIKI KAISHA TOSHIBA, Tokyo (JP)

(72) Inventors: Haruka Obata, Ota Tokyo (JP); Toshihisa Nabetani, Kawasaki Kanagawa (JP); Kabuto Arai, Kawasaki Kanagawa (JP); Kosuke Tatsumura, Yokohama Kanagawa (JP); Yasuyuki Tanaka, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 381 days.

(21) Appl. No.: 17/897,125

(22) Filed: Aug. 27, 2022

(65) Prior Publication Data

US 2023/0276467 A1    Aug. 31, 2023

(30) Foreign Application Priority Data

Feb. 25, 2022    (JP) ................. 2022-027514

(51) Int. Cl.
*H04W 72/30* (2023.01)
*H04L 27/26* (2006.01)
(Continued)

(52) U.S. Cl.
CPC ....... *H04W 72/30* (2023.01); *H04L 27/26025* (2021.01); *H04W 72/0446* (2013.01); *H04W 72/0453* (2013.01)

(58) Field of Classification Search
CPC ........... H04W 72/30; H04W 27/26025; H04W 72/0446; H04W 72/0453; H04L 5/003;
(Continued)

(56) References Cited

U.S. PATENT DOCUMENTS

2019/0266212 A1    8/2019 Goto et al.
2020/0089731 A1    3/2020 Tatsumura et al.
(Continued)

FOREIGN PATENT DOCUMENTS

JP    2019009588 A    1/2019
JP    2019145010 A    8/2019
(Continued)

OTHER PUBLICATIONS

Hanakago, et al., "A Study on Inter-Cluster Interference Coordination for Distributed Antenna Network Using Quantum Computing", The Institute of Electronics, Information and Communication Engineers, IEICE Technical Report RCS2021-77, pp. 1-6, Jul. 2021.
(Continued)

*Primary Examiner* — Charles C Jiang
*Assistant Examiner* — Rachel Elizabeth Marks
(74) *Attorney, Agent, or Firm* — Holtz, Holtz & Volek PC

(57) ABSTRACT

A wireless communication system can change a subcarrier spacing. The system includes a control device and an allocation determination device. The control device controls wireless communication between the terminal devices and the communication device. The allocation determination device generates allocation information indicating a communication block included in communication blocks, where the allocation information is for at least one of the terminal devices. The control device determines an allocation time for allocating by the allocation determination device. The control device outputs, to the allocation determination device, an allocation request including reference information regarding communication and information regarding the allocation time. The allocation determination device outputs the allocation information regarding the terminal devices to the control device by a reply time before the allocation time using the reference information. The control
(Continued)

device performs the allocation process before the allocation time using the allocation information.

17 Claims, 17 Drawing Sheets

(51) Int. Cl.
*H04W 72/0446* (2023.01)
*H04W 72/0453* (2023.01)

(58) Field of Classification Search
CPC . H04L 5/0078; H04L 27/26025; G06N 3/045; G06N 5/01
See application file for complete search history.

(56) References Cited

U.S. PATENT DOCUMENTS

| | | |
|---|---|---|
| 2021/0326407 A1 | 10/2021 | Tatsumura et al. |
| 2021/0329653 A1 | 10/2021 | Aijaz |
| 2021/0360659 A1* | 11/2021 | Zhang .................... H04L 1/1887 |
| 2023/0133172 A1* | 5/2023 | Breuer .................. H04L 5/0007 370/329 |
| 2023/0337200 A1* | 10/2023 | Ali ..................... H04W 74/0833 |
| 2024/0031992 A1* | 1/2024 | Obata ................... H04W 72/51 |

FOREIGN PATENT DOCUMENTS

| | | | |
|---|---|---|---|
| JP | 2020046887 A | 3/2020 | |
| JP | 2021087087 A | 6/2021 | |
| JP | 2022017679 A | 1/2022 | |

OTHER PUBLICATIONS

Japanese Office Action (and an English language translation thereof) dated Mar. 4, 2025, issued in counterpart Japanese Application No. 2022-027514.

* cited by examiner

WIRELESS COMMUNICATION SYSTEM, CONTROL DEVICE, AND COMPUTER PROGRAM PRODUCT

CROSS-REFERENCE TO RELATED APPLICATIONS

This application is based upon and claims the benefit of priority from Japanese Patent Application No. 2022-027514, filed on Feb. 25, 2022; the entire contents of which are incorporated herein by reference.

FIELD

Embodiments described herein relate generally to a wireless communication system, a control device, and a computer program product.

BACKGROUND

In the third generation partnership project (3GPP), the fifth generation mobile communication system (5G mobile communication system) is being studied. The fifth generation mobile communication system is premised on the connection of everything, and aims to meet a wide range of requirements such as high speed, high capacity, high reliability, and low latency.

In the 5G mobile communication system, a base station performs a resource allocation process for determining which communication device is to transmit/receive data at what frequency and time in a radio signal. The base station of the 5G mobile communication systems needs to properly perform the resource allocation process in a very short time in order to meet requirements such as high speed, high capacity, high reliability, and low latency.

DETAILED DESCRIPTION

The problem to be solved by the present disclosure is to provide a wireless communication system, a control device, and a computer program product, which properly and reliably perform an allocation process of allocating any of a plurality of communication blocks each specified by a position in a frequency direction and a position in a time direction so that each of a plurality of terminal devices transmits and receives data.

According to an embodiment, a wireless communication system is capable of changing a subcarrier spacing, and the wireless communication system includes a communication device, a control device, and an allocation determination device. The communication device wirelessly communicates with a plurality of terminal devices. The control device controls wireless communication between the plurality of terminal devices and the communication device. The allocation determination device generates allocation information indicating a communication block included in a plurality of communication blocks specified by a position in a frequency direction and a position in a time direction, where the allocation information is for at least one of the terminal devices. The control device determines an allocation time for performing an allocation process by the allocation determination device. The control device outputs, to the allocation determination device, an allocation request including information indicating at least one of the terminal devices, reference information regarding communication of at least one of the terminal devices, and information regarding the allocation time. The allocation determination device outputs the allocation information regarding at least one of the terminal devices to the control device by a reply time before the allocation time based on the reference information. The control device performs the allocation process before the allocation time based on the allocation information.

Hereinafter, a communication system 10 according to a plurality of embodiments will be described with reference to the drawings.

Figure 1:
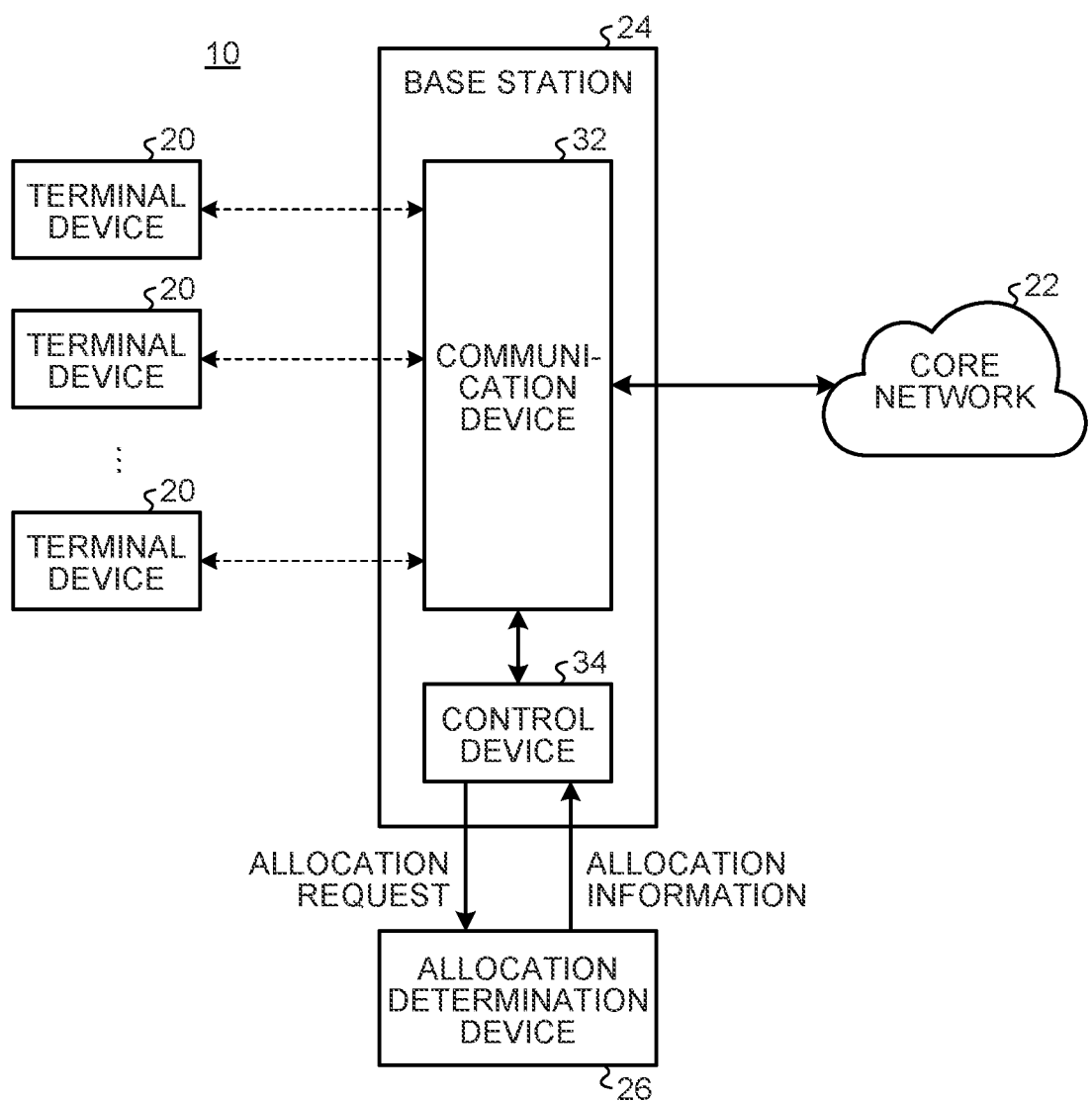
FIG. 1 is a diagram illustrating the configuration of a communication system according to an embodiment.

FIG. 1 is a diagram illustrating the configuration of the communication system 10 according to an embodiment. The communication system 10 is a wireless communication system employing the fifth generation mobile communication system (5G system) standardized in 3GPP.

The communication system 10 includes a plurality of terminal devices 20, a core network 22, a base station 24, and an allocation determination device 26.

In the 5G system, a modulation signal modulated by orthogonal frequency division multiplexing (OFDM) modulation is used as a radio signal, and wireless communication is performed between each of the terminal devices 20 and the base station 24. The modulation signal used in the 5G system is a signal that employs a mixed-numerology system and can change a subcarrier spacing. The 5G system defines a unit called a slot including a predetermined number of (for example, 14) OFDM symbols. Accordingly, the modulation signal in the 5G system, which employs the mixed-numerology system, has a different slot time length for each subcarrier spacing. The 5G system defines a unit called a resource block including a predetermined number of (for example, 12) subcarriers and one slot, and the subcarrier spacing can be changed in units of a resource block.

Furthermore, the 5G system defines a unit called a resource element including one subcarrier and one OFDM symbol. Each of a plurality of resource elements is specified by a subcarrier position indicating a position in a frequency direction and a symbol position indicating a position in a time direction in a modulation signal. One resource block includes a plurality of resource elements (for example, 12 subcarriers×14 OFDM symbols=168 resource elements). Furthermore, the 5G system also defines a unit called a resource block group in which a plurality of resource blocks are bundled.

Furthermore, the 5G system uses a method called massive multiple-input and multiple-output (MIMO) using a plurality of antennas for both transmission and reception, and transmits and receives a modulation signal between each of the terminal devices 20 and the base station 24 by radio waves.

Each of the terminal devices 20 is, for example, an information processing device having a wireless communication function and is owned by a user. Each of the terminal devices 20 is assigned a unique number and transmits and receives a modulation signal defined by the 5G system to and from the base station 24 by wireless communication. Each of the terminal devices 20 can be carried by the user. Any of the terminal devices 20 may be fixed at a predetermined place.

The core network 22 is a backbone communication network in the 5G system. The core network 22 relays packet communication between two base stations 24 and the base station 24, and relays a packet between the base station 24 and other networks.

The base station 24 transmits and receives a modulation signal according to the 5G system to and from each of the terminal devices 20 by wireless communication. Furthermore, the base station 24 relays packet communication between each of the terminal devices 20 and the core network 22.

The base station 24 includes a communication device 32 and a control device 34.

The communication device 32 transmits and receives a modulation signal according to the 5G system to and from each of the terminal devices 20 by wireless communication under the control of the control device 34.

The control device 34 controls transmission and reception of a modulation signal between the terminal devices 20 and the communication device 32. For example, the control device 34 performs an allocation process of allocating any of a plurality of communication blocks included in a modulation signal so that each of one or more target devices to be allocated among the terminal devices 20 transmits and receives data. Each of the communication blocks is specified by a position in the frequency direction and a position in the time direction in the modulation signal. Each of the communication blocks is a resource block group, a resource block, or a resource element. That is, the control device 34 may allocate each of the terminal devices 20 to a resource block group, to a resource block, or to any resource element in the resource block.

In the allocation process, the control device 34 may further allocate a subcarrier spacing for each of a plurality of resource blocks included in the modulation signal. Furthermore, in the allocation process, the control device 34 may further allocate an orthogonal modulation scheme, transmission power, and a coding rate in data included in each of the communication blocks. Furthermore, in the allocation process, the control device 34 may further allocate a propagation channel matrix to be used in a massive MIMO system for each of one or more target devices to be allocated.

When performing the allocation process, the control device 34 outputs an allocation request to the allocation determination device 26. The control device 34 acquires allocation information generated in response to the allocation request from the allocation determination device 26, and performs the allocation process based on the acquired allocation information. Then, the control device 34 causes the terminal devices 20 and the communication device 32 to transmit and receive a modulation signal according to the allocation process.

The allocation determination device 26 is, for example, an information processing device. The allocation determination device 26 may be included in the base station 24, or may be a device separate from the base station 24 and may be connected to the base station 24 via a network.

In response to the allocation request from the control device 34, the allocation determination device 26 generates allocation information indicating a communication block included in the communication blocks, and each of the terminal devices 20 transmits and receives data. Furthermore, the allocation determination device 26 may generate the allocation information further indicating a subcarrier spacing for each of a plurality of resource blocks. Furthermore, the allocation determination device 26 may also generate the allocation information further indicating an orthogonal modulation scheme, transmission power, and a coding rate in data included in each of the communication blocks. Furthermore, for each of one or more target devices to be allocated, the allocation determination device 26 may also generate the allocation information further indicating a propagation channel matrix to be used in the massive MIMO system. The allocation determination device 26 returns the generated allocation information to the control device 34 having transmitted the allocation request.

Figure 2:
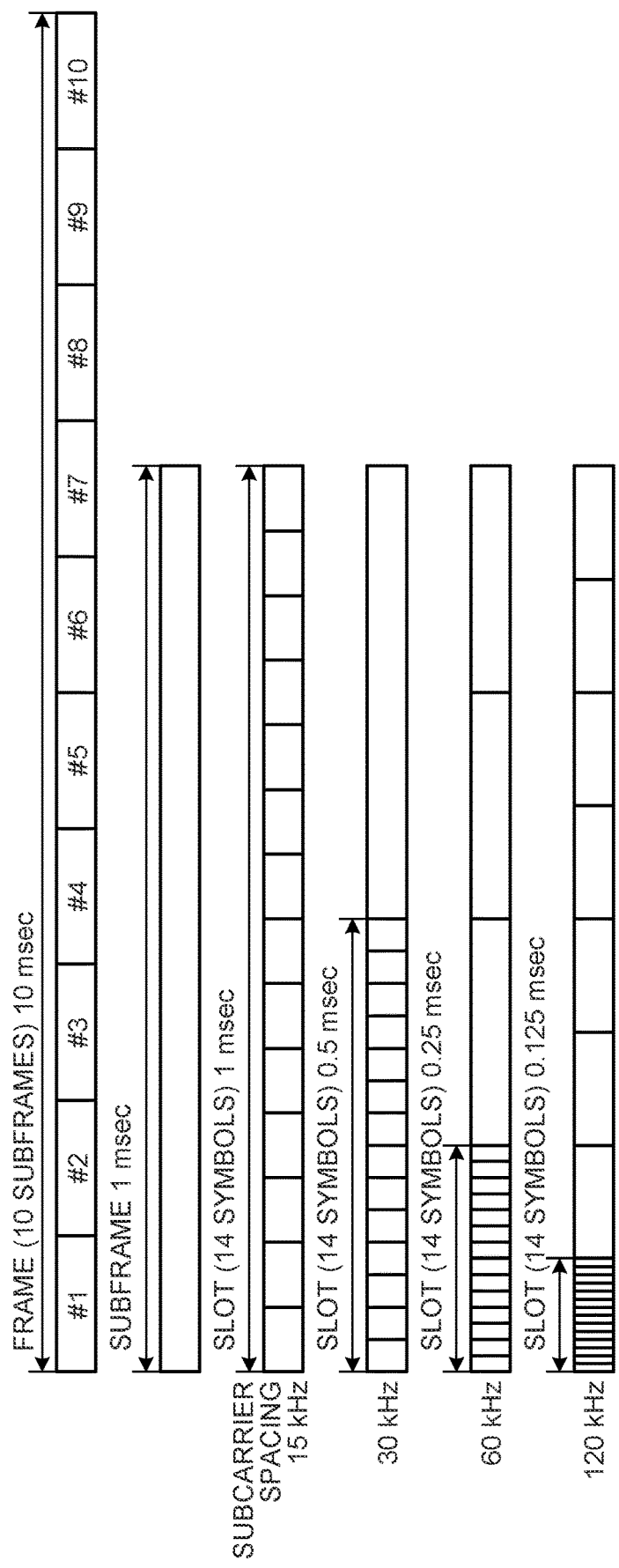
FIG. 2 is a diagram illustrating a frame structure of a modulation signal.

FIG. 2 is a diagram illustrating a frame structure of the modulation signal of the 5G system.

The 5G system defines a frame with a predetermined time length. One frame is 10 msec. One frame includes 10 subframes each having a predetermined time length. One subframe is 1 msec.

The 5G system defines five types of subcarrier spacings: 15 kHz ($\mu=0$), 30 kHz ($\mu=1$), 60 kHz ($\mu=2$), 120 kH ($\mu=3$), and 240 kH ($\mu=4$). Note that $\mu$ is a value for identifying the subcarrier spacing.

The 5G system defines a unit called a slot including 14 OFDM symbols. The OFDM symbols have different time lengths depending on the subcarrier spacing. Accordingly, the time length of the slot depends on the subcarrier spacing.

One subframe includes one or more slots. When the subcarrier spacing is set to 15 kHz, one subframe includes one slot. When the subcarrier spacing is set to 30 kHz, one subframe includes two slots. When the subcarrier spacing is set to 60 kHz, one subframe includes four slots. When the subcarrier spacing is set to 120 kHz, one subframe includes eight slots. When the subcarrier spacing is set to 240 kHz, one subframe includes 16 slots.

The smaller the subcarrier spacing, the longer the time length of the slot and the stronger against multipath, but the larger the delay amount. For example, when the subcarrier spacing is 15 kHz, the time length of the slot is 1 msec, which is strong against multipath, but the delay amount is large. The larger the subcarrier spacing, the shorter the time length of the slot and the smaller the delay amount, but the more susceptible to inter-symbol interference (ISI). For example, when the subcarrier spacing is 120 kHz, the time length of the slot is 0.125 msec, and the delay amount is small, but the more susceptible to the ISI.

Accordingly, preferably, the control device 34 allocates, for example, a terminal device 20, which is moving at low speed and transmits and receives data with a large allowable delay time, to a resource block with a small subcarrier spacing or a resource element included in the resource block with a small subcarrier spacing. Furthermore, preferably, the control device 34 allocates, for example, a terminal device 20, which is moving at a high speed and transmits and receives data with a small allowable delay time, to a resource block with a large subcarrier spacing or a resource element included in the resource block with a large subcarrier spacing.

Figure 3:
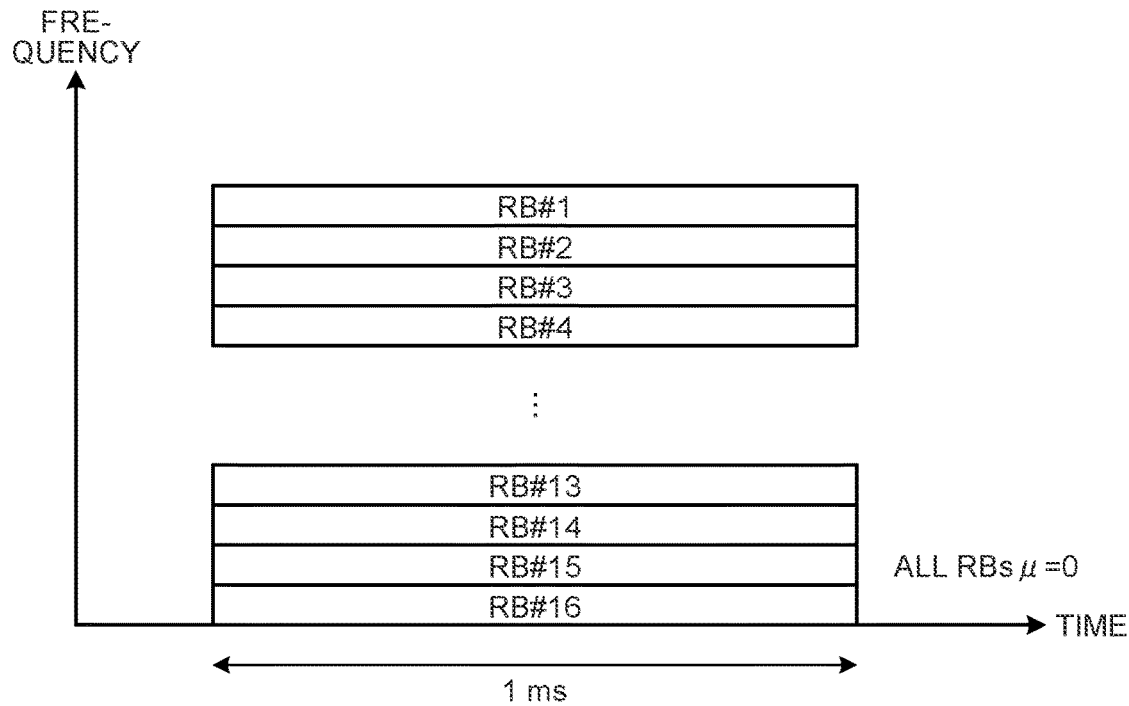
FIG. 3 is a diagram illustrating a first arrangement example of resource blocks.

FIG. 3 is a diagram illustrating a first arrangement example of resource blocks. The resource block (RB) includes one slot (14 OFDM symbols) in the time direction and a predetermined number of subcarriers in the frequency direction. Furthermore, in the modulation signal of the 5G system, a plurality of resource blocks are grouped into one resource block group. For example, when a band having a width of 100 MHz is used, the modulation signal of the 5G system includes 17 resource block groups in one subframe.

For example, it is assumed that one subframe includes 16 resource blocks. In this case, 16 resource blocks are configured by one slot (14 OFDM symbols) and 192 (12×16) subcarriers. For example, as illustrated in FIG. 3, the control device 34 may allocate an entire region of a band to the largest subcarrier spacing of 15 kHz (μ=0). When the subcarrier spacing is allocated in this way, the control device 34 can cause all of the terminal devices 20 to transmit and receive data having a large allowable delay time but resistant to multipath.

Figure 4:
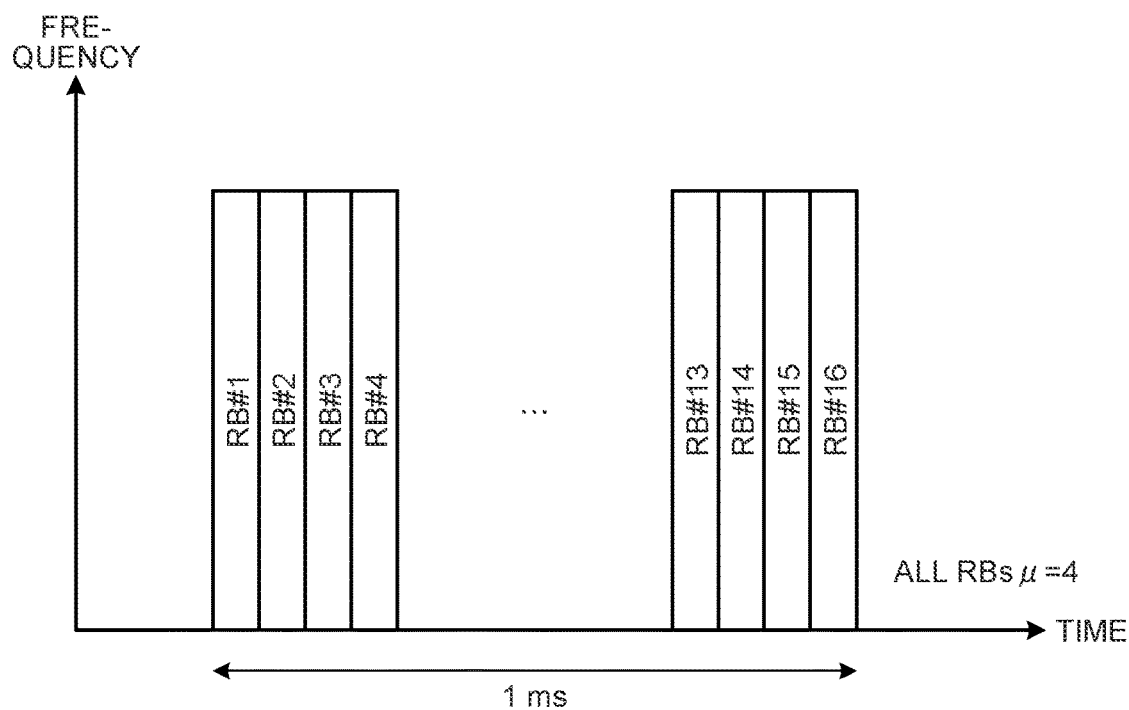
FIG. 4 is a diagram illustrating a second arrangement example of resource blocks.

FIG. 4 is a diagram illustrating a second arrangement example of resource blocks. For example, as illustrated in FIG. 4, the control device 34 may allocate the entire region of the band to the smallest subcarrier spacing of 240 kHz (μ=4). When the subcarrier spacing is allocated in this way, the control device 34 can cause all of the terminal devices 20 to transmit and receive data having a small allowable delay time.

Figure 5:
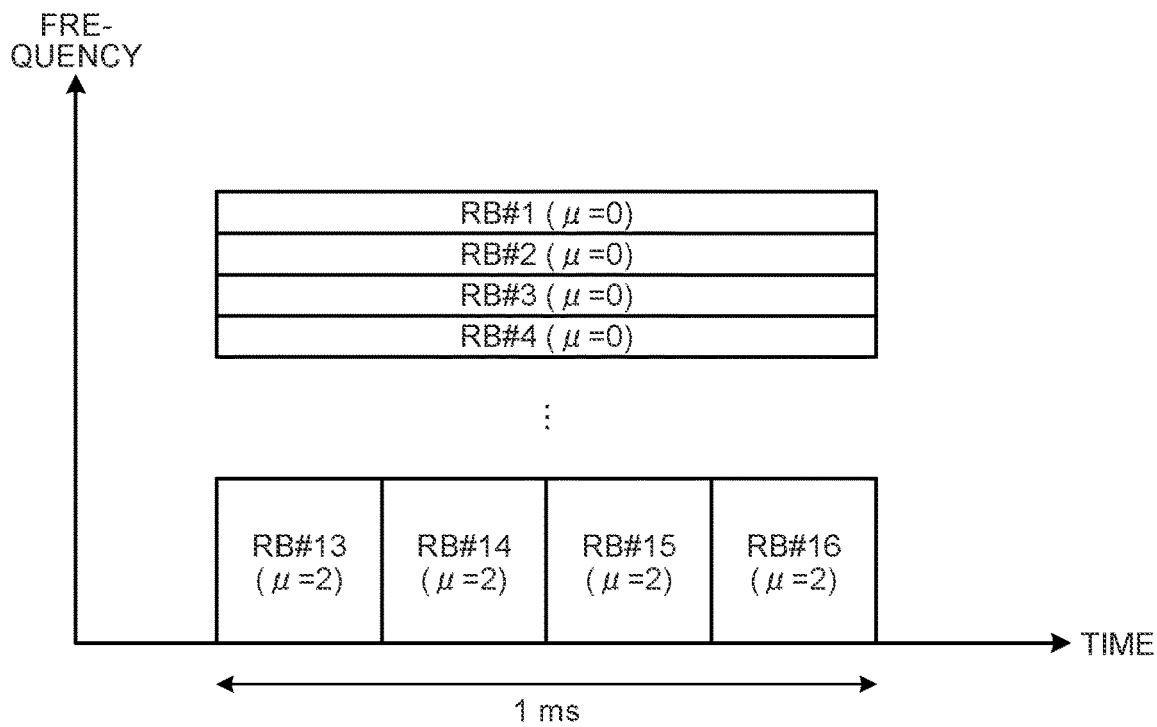
FIG. 5 is a diagram illustrating a third arrangement example of resource blocks.

FIG. 5 is a diagram illustrating a third arrangement example of resource blocks. For example, as illustrated in FIG. 5, the control device 34 may divide the band into two regions, allocate one region to the largest subcarrier spacing of 15 kHz (μ=0), and allocate the other region to the subcarrier spacing of 60 kHz (μ=2). When the subcarrier spacing is allocated in this way, the control device 34 can cause a terminal device 20 that transmits and receives data having a large allowable delay time but requiring high quality and a terminal device 20 that transmits and receives data requiring no high quality but having a small allowable delay time to mix in a subframe, and to transmit and receive data.

The control device 34 can divide the band into a plurality of regions in this way, and allocate different subcarrier spacings to each of the regions. This allows the control device 34 to allocate the terminal device 20 to resource blocks having an appropriate subcarrier spacing, thereby satisfying the requirements of the terminal devices 20.

Figure 6:
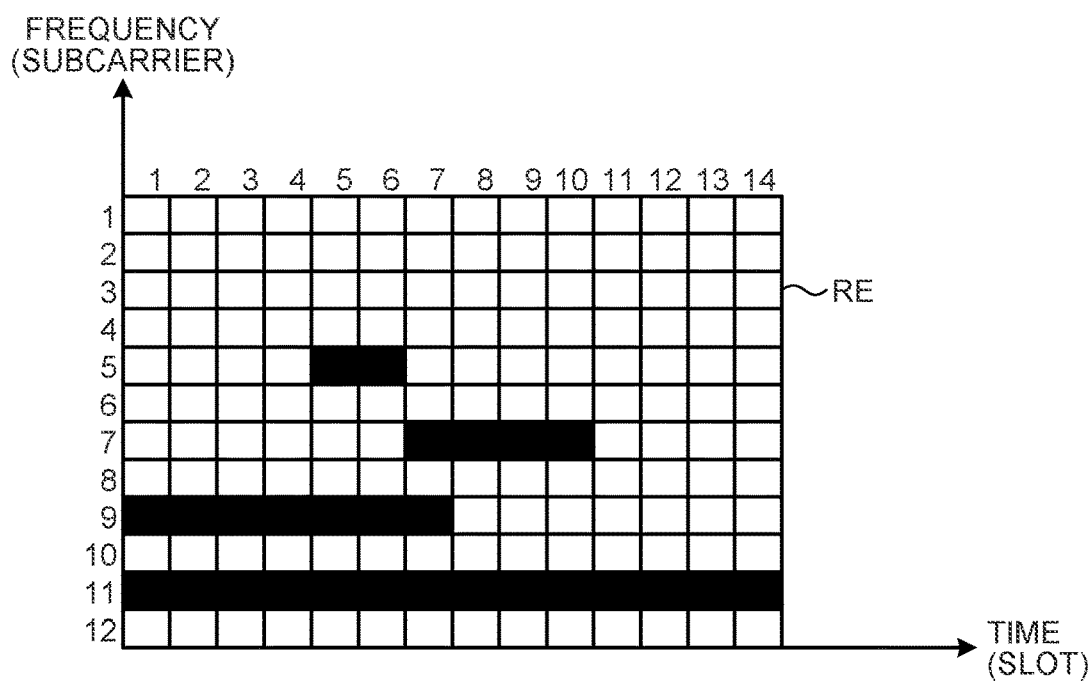
FIG. 6 is a diagram illustrating the configuration of a resource block and an example of mini-slot allocation.

FIG. 6 is a diagram illustrating the configuration of the resource block and an example of mini-slot allocation.

One resource block includes, for example, 14 OFDM symbols in the time direction and 12 subcarriers in the frequency direction. Accordingly, one resource block includes 168 (12×14) resource elements (REs). Each of the 168 resource elements can be specified by a subcarrier position indicating a position in the frequency direction and a symbol position indicating a position in the time direction in a modulation signal.

The 5G system defines a unit including n consecutive OFDM symbols and one subcarrier. Where, n is any of 2 through 13 or 14. The control device 34 can also allocate the terminal device 20 for transmitting and receiving data to any resource element (RE) in the resource block in units of such mini-slots.

For example, by allocating the terminal device 20 to such a mini-slot and setting the resource block including such a mini-slot to the smallest subcarrier spacing of 240 kHz (μ=4), the control device 34 can cause the allocated terminal device 20 to transmit and receive data requiring ultra-low latency.

Figure 7:
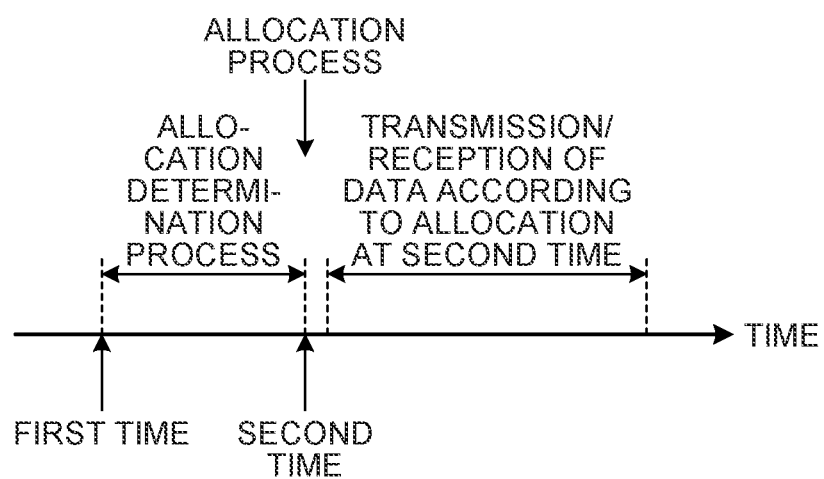
FIG. 7 is a diagram illustrating the timing of an allocation process.

FIG. 7 is a diagram illustrating the timing of an allocation process. Prior to the execution of the allocation process, the control device 34 selects one or more target devices to be allocated at the first time among the terminal devices 20. The second time is a time after the first time, and is an allocation time at which the allocation process is performed to allocate the selected one or more target devices at the first time to a resource block or a resource element after the second time.

Between the first time and the second time, the control device 34 determines whether to allocate the one or more target devices at the first time to which of a plurality of resource blocks or a plurality of resource elements after the second time. In this case, the control device 34 outputs an allocation request to the allocation determination device 26 and acquires the allocation information from the allocation determination device 26 by the second time. Then, the control device 34 performs the allocation process at the second time based on the allocation information acquired from the allocation determination device 26, and causes the terminal devices 20 and the communication device 32 to transmit and receive a modulation signal according to the allocation process. Alternatively, the control device 34 may perform the allocation process before the second time and cause the terminal devices 20 and the communication device 32 to transmit and receive a modulation signal according to the allocation process.

Figure 8:
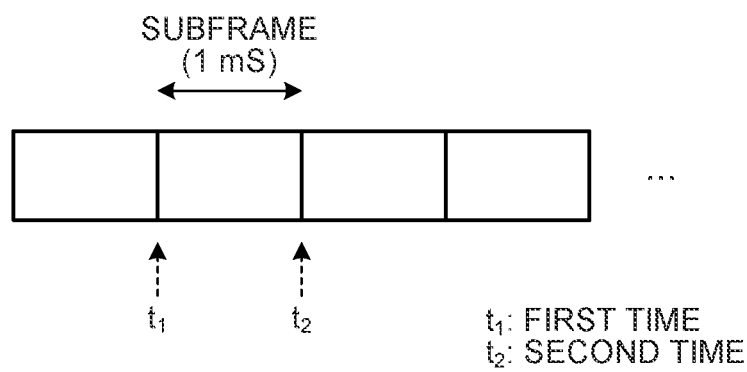
FIG. 8 is a diagram illustrating a first setting example of a first time and a second time.

FIG. 8 is a diagram illustrating a first setting example of the first time and the second time.

For example, the first time and the second time are times predetermined by scheduling. When the control device 34 performs the allocation process for each predetermined number of subframes, the first time is a time before a predetermined number of subframes subject to the allocation process. The first time may be the start time of the subframe, or may be a time shifted from the start time of the subframe by a predetermined time before or after. When the control device 34 performs the allocation process for each predetermined number of subframes, the second time may be the start time of a predetermined number of subframes to be allocated, or may be a time before the start time of the predetermined number of target subframes.

For example, the first time and the second time may be times asynchronous with the subframe. For example, the first time and the second time may be times set by the occurrence of a predetermined event. For example, the control device 34 may determine, as the first time, the time when a predetermined amount or more of downlink data is accumulated in the communication device 32 or a predetermined amount or more of reservation requests for transmission/reception allocation are accumulated. Furthermore, when the time at which the predetermined event has occurred is set as the first time, for example, the control device 34 may set a time after a predetermined time from the first time as the second time. Furthermore, when the time at which the predetermined event has occurred is set as the first time, for example, the control device 34 may set, as the second time, the start time of a subframe immediately after the first time or a time before a predetermined time of the start time of the subframe immediately after the first time.

Figure 9:
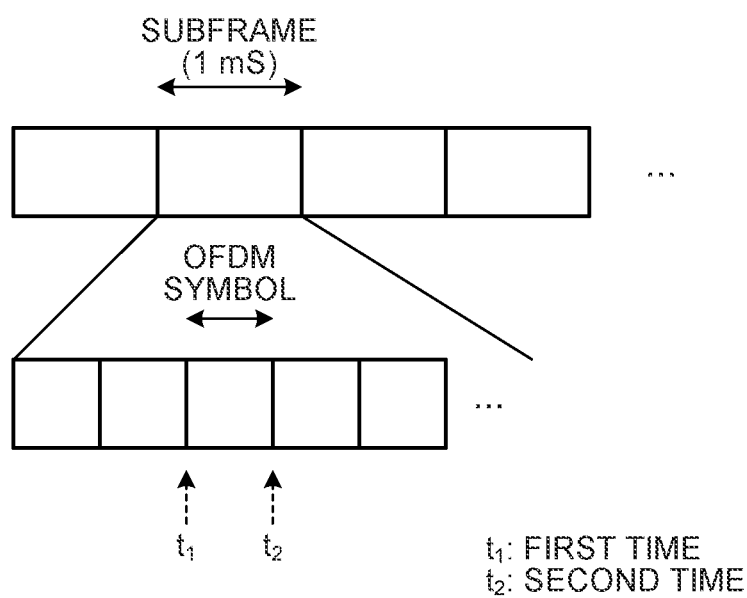
FIG. 9 is a diagram illustrating a second setting example of a first time and a second time.

FIG. 9 is a diagram illustrating a second setting example of the first time and the second time.

The control device 34 can allocate a terminal device 20 for transmitting and receiving data, in units of mini-slots. Accordingly, the control device 34 may set the difference between the first time and the second time to a minimum time length of an OFDM symbol. The minimum time length of the OFDM symbol is a time length of the OFDM symbol when the subcarrier spacing is the smallest 240 kHz ($\mu=^4$).

Furthermore, the control device 34 may also change the difference between the first time and the second time. For example, the control device 34 may determine the second time according to an allowable delay time of data transmitted and received by one or more target devices. For example, the control device 34 may reduce the difference between the first time and the second time as the allowable delay time is shorter. As a result, the control device 34 can allow data to be transmitted and received at an earlier time as the allowable delay time is shorter.

Figure 10:
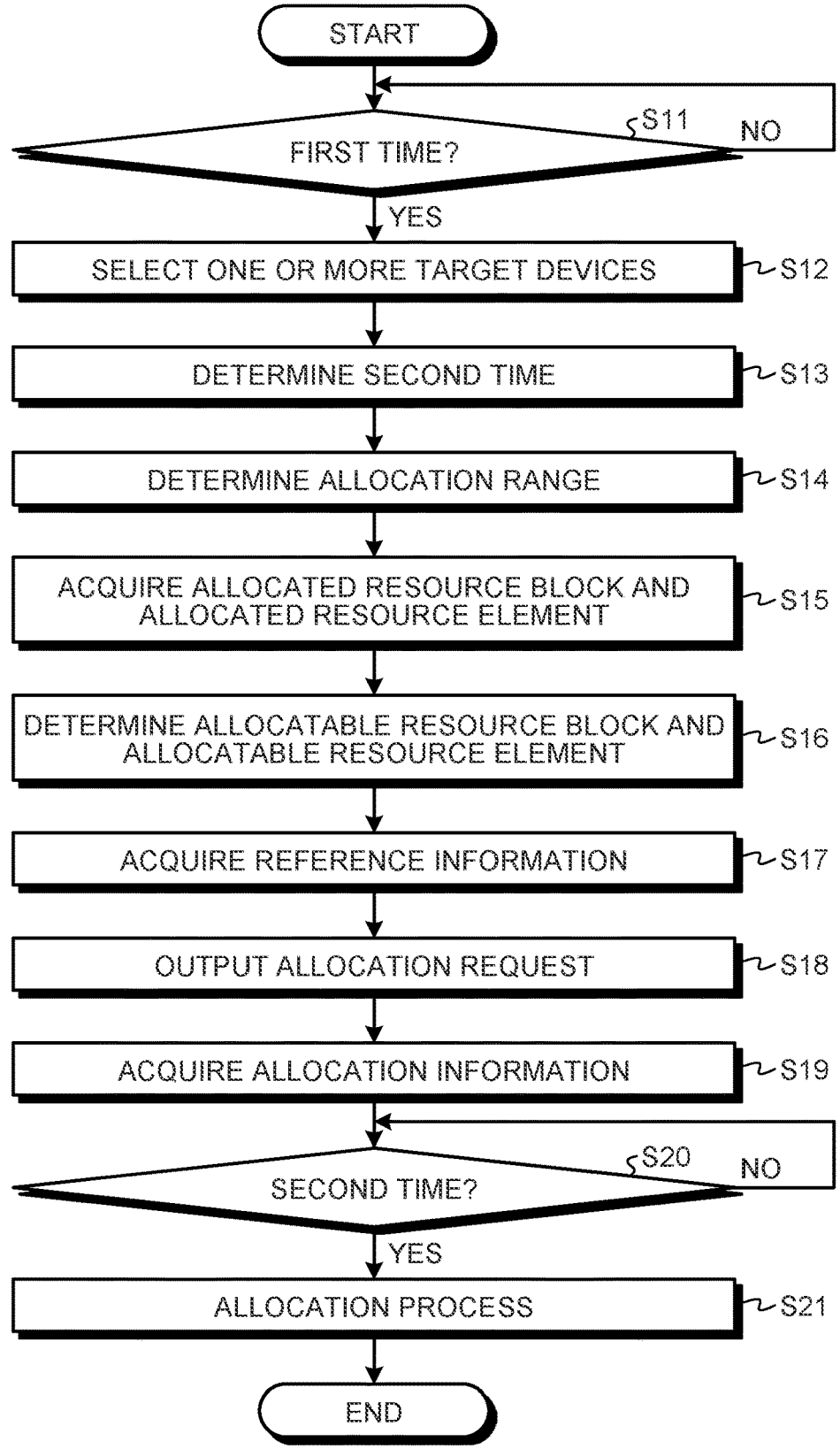
FIG. 10 is a flowchart illustrating a processing flow of a control device.

FIG. 10 is a flowchart illustrating a process flow of the control device 34. The control device 34 performs the process according to the flow illustrated in FIG. 10.

First, at S11, the control device 34 determines whether it is the first time. The first time is, for example, a pre-scheduled time or the time when a predetermined event has occurred.

Subsequently, at S12, the control device 34 selects one or more target devices to be allocated at the first time among the terminal devices 20. The one or more target devices to be allocated at the first time may be all of the terminal devices 20 wirelessly connected to the base station 24, or a part of the terminal devices 20. For example, when the maximum number of allocatable terminal devices 20 are predetermined in one allocation process, the control device 34 may select terminal devices 20 in a range not exceeding the maximum number as target devices.

Furthermore, for example, when downlink data is accumulated in the communication device 32 at the first time, the control device 34 may preferentially select, as a target device, a terminal device 20 that receives the downlink data accumulated in the communication device 32. Moreover, when a reservation request for transmission/reception allocation is accumulated in the communication device 32 at the first time, the control device 34 may preferentially select, as a target device, a terminal device 20 that is the target of the reservation request accumulated in the communication device 32.

Furthermore, when downlink data with an allowable delay time of a predetermined time or less is accumulated in the communication device 32 at the first time, the control device 34 may preferentially select, as a target device, a terminal device 20 that receives the downlink data with the allowable delay time of a predetermined time or less. Moreover, when a reservation request for transmission/reception allocation of data with an allowable delay time of a predetermined time or less is accumulated in the communication device 32 at the first time, the control device 34 may preferentially select, as a target device, a terminal device 20 that transmits and receives the data whose allowable delay time to be reserved is a predetermined time or less.

Subsequently, at S13, the control device 34 determines the second time for performing the allocation process.

Subsequently, at S14, the control device 34 determines an allocation range in a modulation signal. The allocation range is a range including a plurality of subcarriers and a plurality of OFDM symbols after the second time. For example, the allocation range is a range including a predetermined number of subcarriers and a predetermined number of OFDM symbols after the second time. For example, when the allocation process is performed for each predetermined number of subframes, the allocation range is a range including all subcarriers included in the modulation signal and a plurality of OFDM symbols included in a predetermined number of subframes after the second time.

The allocation range may be changed for each allocation process. For example, the control device 34 may change the allocation range according to the number of one or more target devices. For example, when the one or more target devices include the terminal device 20 that transmits and receives the data with the allowable delay time of a predetermined time or less, the control device 34 may set the allocation range as a range including a first number of OFDM symbols immediately after the second time. Then, when the one or more target devices does not include the terminal device 20 that transmits and receives the data with the allowable delay time of a predetermined time or less, the control device 34 may set the allocation range as a range including a second number of OFDM symbols, the second number being larger than the first number. As a result, the control device 34 can allow data with an allowable delay time of a predetermined time or less to be transmitted and received at an earlier time.

Subsequently, at S15, the control device 34 acquires allocated communication blocks that are included in the allocation range and have already been allocated by a device that transmits and receives data. More specifically, the control device 34 acquires allocated resource blocks and allocated resource elements included in the allocation range, the allocated resource blocks being resource blocks already allocated by the terminal device 20 that transmits and receives data, the allocated resource elements being resource elements already allocated by the terminal device 20 that transmits and receives data.

Subsequently, at S16, the control device 34 determines some communication blocks, excluding the allocated communication blocks included in the allocation range, as a plurality of allocatable communication blocks. More specifically, the control device 34 determines a plurality of resource blocks included in the allocation range, excluding the allocated resource blocks, as a plurality of allocatable resource blocks. Furthermore, the control device 34 determines a plurality of resource elements included in the allocation range, excluding the allocated resource elements, as a plurality of allocatable resource elements.

Subsequently, at S17, the control device 34 acquires reference information regarding communication of each of the one or more target devices.

The reference information includes, for example, the allowable delay time of data to be transmitted and received by each of the one or more target devices. Furthermore, the reference information may include the communication quality of data transmitted and received in the past by each of the one or more target devices. Information regarding data quality includes a channel quality indicator (CQI), a modulation and coding scheme (MCS), transmission power, an error rate, and the like for a target device. The CQI is an index value indicating the reception quality of the target device. The MCS is information including an orthogonal modulation scheme and a coding rate. The CQI, the MCS, the transmission power and the error rate may be historical average values or values of an immediately preceding time slot.

Furthermore, the reference information may include information regarding the amount of data in each of the one or more target devices. The information regarding the amount of data may also include, for the target device, the amount of untransmitted data, the amount of data per unit time for data transmitted and received in the past, the frequency of occurrence of data transmitted and received in the past, the trend of occurrence of data transmitted and received in the past, the predicted frequency of occurrence of future data, the predicted trend of occurrence of future data, and the like. The reference information may also include a historical propagation channel matrix in each of the one or more target devices.

Subsequently, at S18, the control device 34 generates an allocation request and outputs the allocation request to the allocation determination device 26. The allocation request includes information indicating one or more target devices, reference information regarding communication of each of the one or more target devices, and information indicating the second time. The allocation request may further include information indicating a plurality of allocatable communication blocks. The information indicating the allocatable communication blocks is information for specifying a position in the frequency direction and a position in the time direction for each of a plurality of allocatable resource blocks and for each of a plurality of allocatable resource elements.

Upon receiving the allocation request from the control device 34, the allocation determination device 26 generates allocation information and outputs the allocation information to the control device 34 by the second time. The allocation information indicates that each of the one or more target devices transmits and receives data by which of the resource elements in the allocation range.

Furthermore, the allocation information may further indicate a subcarrier spacing for each of the resource blocks in the allocation range. Furthermore, the allocation information may further indicate an orthogonal modulation scheme, transmission power, and a coding rate in the data included in each of the communication blocks. Furthermore, the allocation information may further indicate a propagation channel matrix to be used in the Massive MIMO scheme for each of the one or more target devices to be allocated.

The allocation determination device 26 receives the allocation request output from the control device 34 at S18.

Upon receiving the allocation request, the allocation determination device 26 generates the allocation information based on the information indicating the one or more target devices, the information indicating the allocatable communication blocks, and the reference information. The allocation determination device 26 outputs the generated allocation information to the control device 34 by a reply time at which the control device 34 can perform the allocation process at the second time. That is, the allocation determination device 26 outputs the allocation information to the control device 34 by the reply time before the second time.

For example, the allocation determination device 26 generates the allocation information by using a machine learning model based on the information indicating the one or more target devices, the information indicating the allocatable communication blocks, and the reference information. For example, the allocation determination device 26 may also generate the allocation information by using, for example, a solver that calculates a solution to a quadratic unconstrained binary optimization (QUBO) problem. In this case, the allocation determination device 26 generates an objective function for the QUBO problem based on the information indicating the one or more target devices, the information indicating the allocatable communication blocks, and the reference information, provides the generated objective function to the QUBO solver, acquires a solution that minimizes the objective function, and generates the allocation information based on the acquired solution.

The allocation determination device 26 can change a computation time between the reception of the information and the output of the allocation information. Then, upon receiving the allocation request, the allocation determination device 26 sets a processing time so that the allocation information can be reliably generated by the reply time, based on the second time included in the allocation request.

For example, the allocation determination device 26 may include a plurality of machine learning models having different computation times. In this case, the allocation determination device 26 may select a machine learning model capable of outputting allocation information by the reply time among the machine learning models, and generate the allocation information by using the selected machine learning model. Furthermore, for example, the allocation determination device 26 may also use a QUBO solver capable of setting the computation time. In this case, the allocation determination device 26 sets a parameter related to the computation time in the QUBO solver based on the second time so that the allocation information can be output by the reply time.

Subsequently, at S19, the control device 34 acquires the allocation information from the allocation determination device 26.

Subsequently, at S20, the control device 34 determines whether the second time has reached. When the second time has not reached (No at S20), the control device 34 waits for the process at S20, and when the second time has reached (Yes at S20), the control device 34 advances the process to S21.

At S21, the control device 34 performs the allocation process based on the allocation information acquired from the allocation determination device 26, and causes the terminal devices 20 and the communication device 32 to transmit and receive a modulation signal according to the allocation process. The allocation process can be performed, for example, by the control device 34 causing information regarding the communication block allocated to the communication device 32 to be transmitted to the terminal device 20.

The above process is performed, so that the communication device 32 can transmit and receive data to and from the terminal device 20 allocated in the allocation process in the allocation range.

Figure 11:
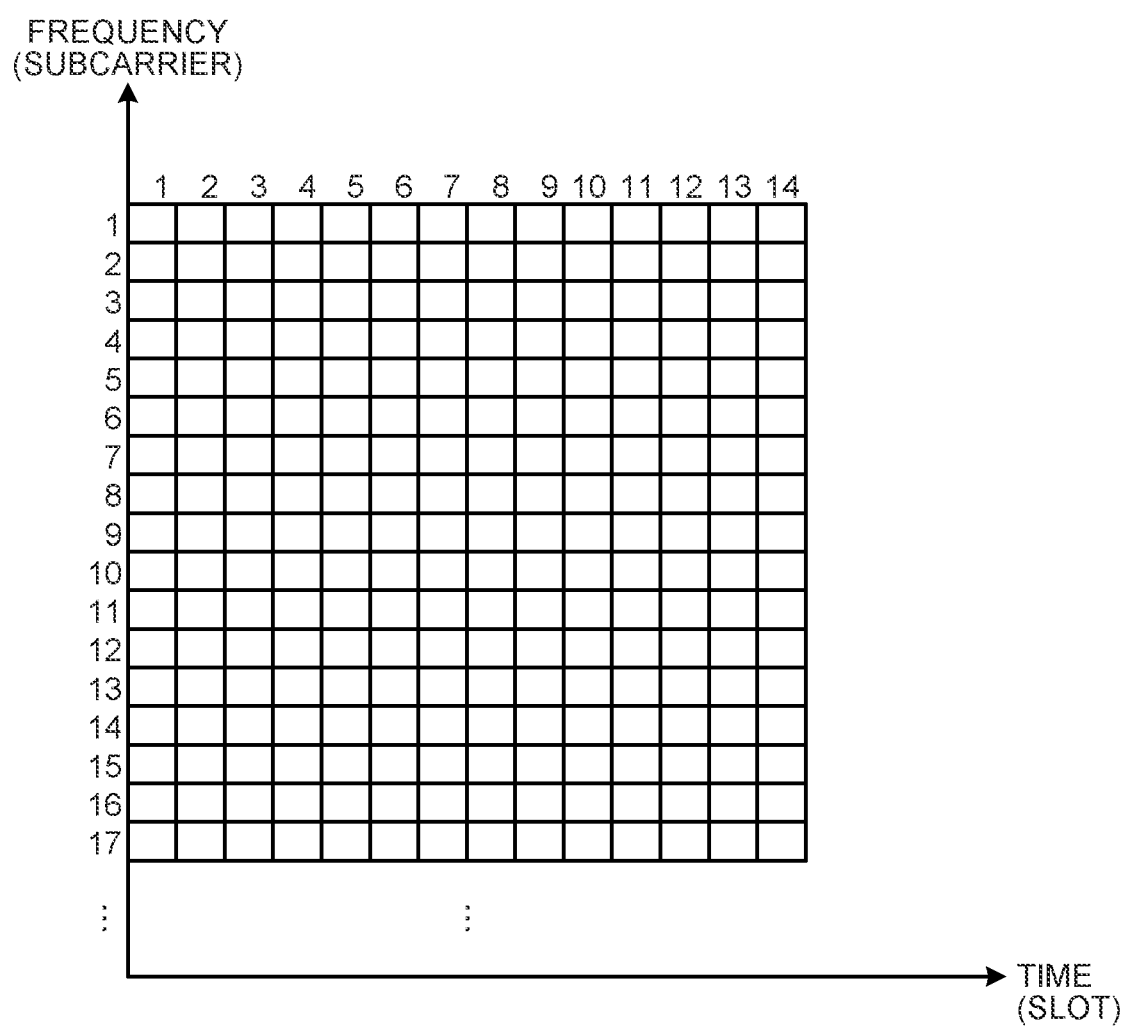
FIG. 11 is a diagram illustrating an example of a description format of allocation information.

FIG. 11 is a diagram illustrating an example of a description format of allocation information.

For example, the allocation information indicates which terminal device 20 transmits or receives data in each of the resource elements included in the allocation range. Some of the resource elements may not be allocated to any of the terminal devices 20.

As an example, such allocation information is represented by a plurality of boxes arranged in a matrix form representing the resource elements within the allocation range. In this case, each of the boxes corresponds to one resource element. Positions in one of a row direction and a column direction of the boxes arranged in a matrix form are specified by positions of subcarriers in the allocation range. Furthermore, positions in the other of the row direction and the column direction of the boxes arranged in a matrix form are specified by positions of OFDM symbols.

The allocation information in such a description format represents a solution to a box-packing problem that solves which of the terminal devices 20 is to be placed in each of the boxes. Accordingly, the allocation determination device 26 can generate the allocation information by using an algorithm for solving the box-packing problem.

For example, the allocation determination device 26 can generate allocation information representing the solution to the box-packing problem by pre-training a machine learning model such as a neural network. For example, a designer of the allocation determination device 26 provides input information including the information indicating the one or more target devices, the information indicating the allocatable communication blocks, and the reference information, and generates a neural network that outputs the solution to the box-packing problem. Then, the designer trains the generated neural network based on teacher data including past input information and ideal solutions. By using the machine learning model generated in this way, the allocation determination device 26 can generate the allocation information based on the information indicating the one or more target devices, the information indicating the allocatable communication blocks, and the reference information.

Furthermore, the allocation determination device 26 can also generate such allocation information by solving a QUBO problem for which an objective function is a quadratic function including a plurality of binary variables. In this case, the quadratic function, which is the objective function, includes a plurality of binary variables having a one-to-one correspondence with the terminal devices 20 as many as the number corresponding to the boxes constituting a matrix. Moreover, the quadratic function may further include a plurality of binary variables representing constraint conditions.

Based on the information indicating the one or more target devices, the information indicating the allocatable communication blocks, and the reference information, the designer of the allocation determination device 26 generates a quadratic function for which a solution when minimized obtains allocation information closer to preset conditions. Then, based on the information indicating the one or more target devices, the information indicating the allocatable communication blocks, and the reference information, the designer of the allocation determination device 26 generates a formulation algorithm for generating such a quadratic function.

By using the formulation algorithm generated in this way, the allocation determination device 26 generates the quadratic function which is the objective function based on the information indicating the one or more target devices, the information indicating the allocatable communication blocks, and the reference information. Subsequently, the allocation determination device 26 provides the generated quadratic function to the QUBO solver and calculates solutions of the quadratic function. Then, the allocation determination device 26 generates the allocation information based on solutions of the quadratic variables representing the solutions of the box-packing problem among the solutions of the quadratic function calculated by the QUBO solver.

Furthermore, the allocation determination device 26 may also generate the allocation information, for example, by determining an allocation order for each of the one or more target devices and allocating the target devices to the boxes arranged in a matrix form according to the determined order. In this case, the allocation determination device 26 may rank the target devices in ascending order of the amount of data to be transmitted or received, in ascending order of the allowable delay time, or in ascending order of the amount of data transmitted or received in the past.

Figure 12:
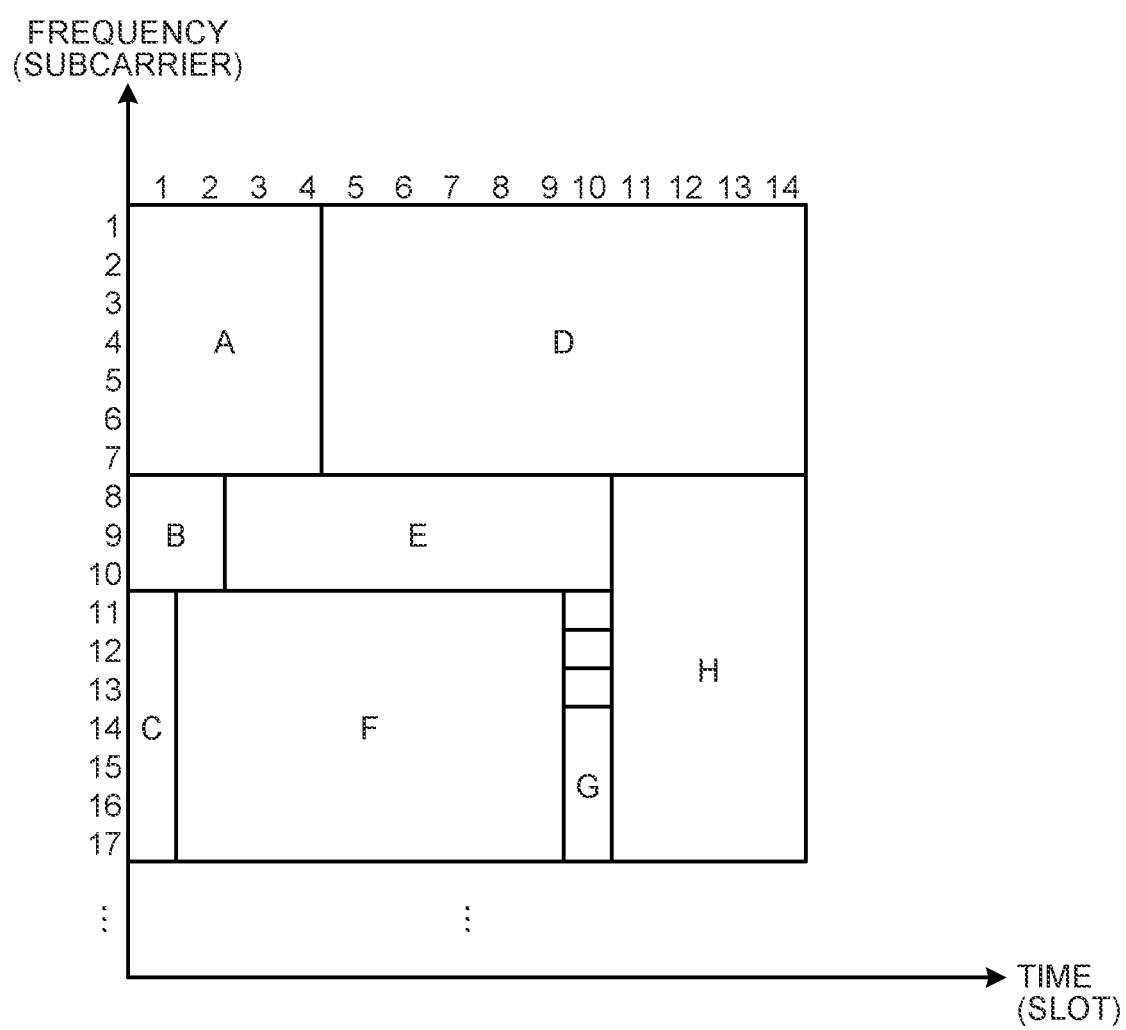
FIG. 12 is a diagram illustrating an example of allocation information generated by an allocation determination device.

FIG. 12 is a diagram illustrating an example of the allocation information generated by the allocation determination device 26. A to H illustrated in FIG. 12 are information for identifying users of the terminal devices 20 allocated to resource elements.

For example, it is assumed that the reference information includes an allowable delay time of data transmitted and received by each of the one or more target devices. In this case, the allocation determination device 26 uses a machine learning model or a formulation algorithm for generating the allocation information so that a target device with a short allowable delay time is allocated to a resource element that completes transmission and reception at an earlier time than a target device with a long allowable delay time. More specifically, the allocation determination device 26 uses the machine learning model or the formulation algorithm for the generating allocation information so that the target device with a short allowable delay time is allocated to a resource element of an OFDM symbol earlier in time than the target device with a long allowable delay time. For example, it is assumed that the reference information indicates that the terminal device 20 of the user A has a shorter allowable delay time of data to be transmitted/received than the terminal device 20 of the user D. In this case, by using the machine learning model or the formulation algorithm, the allocation determination device 26 can allocate the terminal device 20 of the user A to a resource block earlier in time than the terminal device 20 of the user D, as illustrated in FIG. 12.

Furthermore, the allocation determination device 26 may also use the machine learning model or the formulation algorithm for generating the allocation information so as to increase the number of target devices capable of performing wireless communication within the allowable delay time among the one or more target devices.

Furthermore, for example, it is assumed that the reference information includes the amount of data per unit time for data transmitted and received in the past by each of the one or more target devices or the amount of data per unit time predicted in the future. In this case, the allocation determination device 26 may use the machine learning model or the formulation algorithm for generating the allocation information so as to increase the number of target devices satisfying a data transmission/reception amount per unit time. Furthermore, in this case, for target devices for which the amount of data per unit time for data transmitted and received in the past or the amount of data per unit time predicted in the future exceeds a threshold value, the allocation determination device 26 may also use the machine learning model or the formulation algorithm for generating the allocation information so as to satisfy the amount of data transmitted/received per unit time.

Furthermore, the allocation determination device 26 may also use the machine learning model or the formulation algorithm for generating the allocation information so that the total amount of data transmitted/received per unit time is maximized.

Furthermore, for example, it is assumed that the reference information includes the communication quality of data transmitted/received in the past by each of the one or more target devices. In this case, the allocation determination device 26 may use the machine learning model or the formulation algorithm for generating the allocation information so that a target device having high communication quality of the data transmitted/received in the past is allocated to a higher coding rate or a higher orthogonal modulation scheme than a target device having low communication quality.

More specifically, the allocation determination device 26 uses the machine learning model or the formulation algorithm for generating the allocation information so that the target device having high communication quality of the data transmitted/received in the past is allocated to a resource element included in a resource block having a larger subcarrier spacing than the target device having low communication quality. For example, it is assumed that the reference information indicates that the terminal device 20 of the user C has higher communication quality than the terminal device 20 of the user D. In this case, by using the machine learning model or the formulation algorithm, the allocation determination device 26 can allocate the terminal device 20 of the user C to a larger number of subcarriers than the terminal device 20 of the user D, as illustrated in FIG. 12.

As described above, the allocation determination device 26 can generate the allocation information by using the algorithm for solving the box-packing problem.

Figure 13:
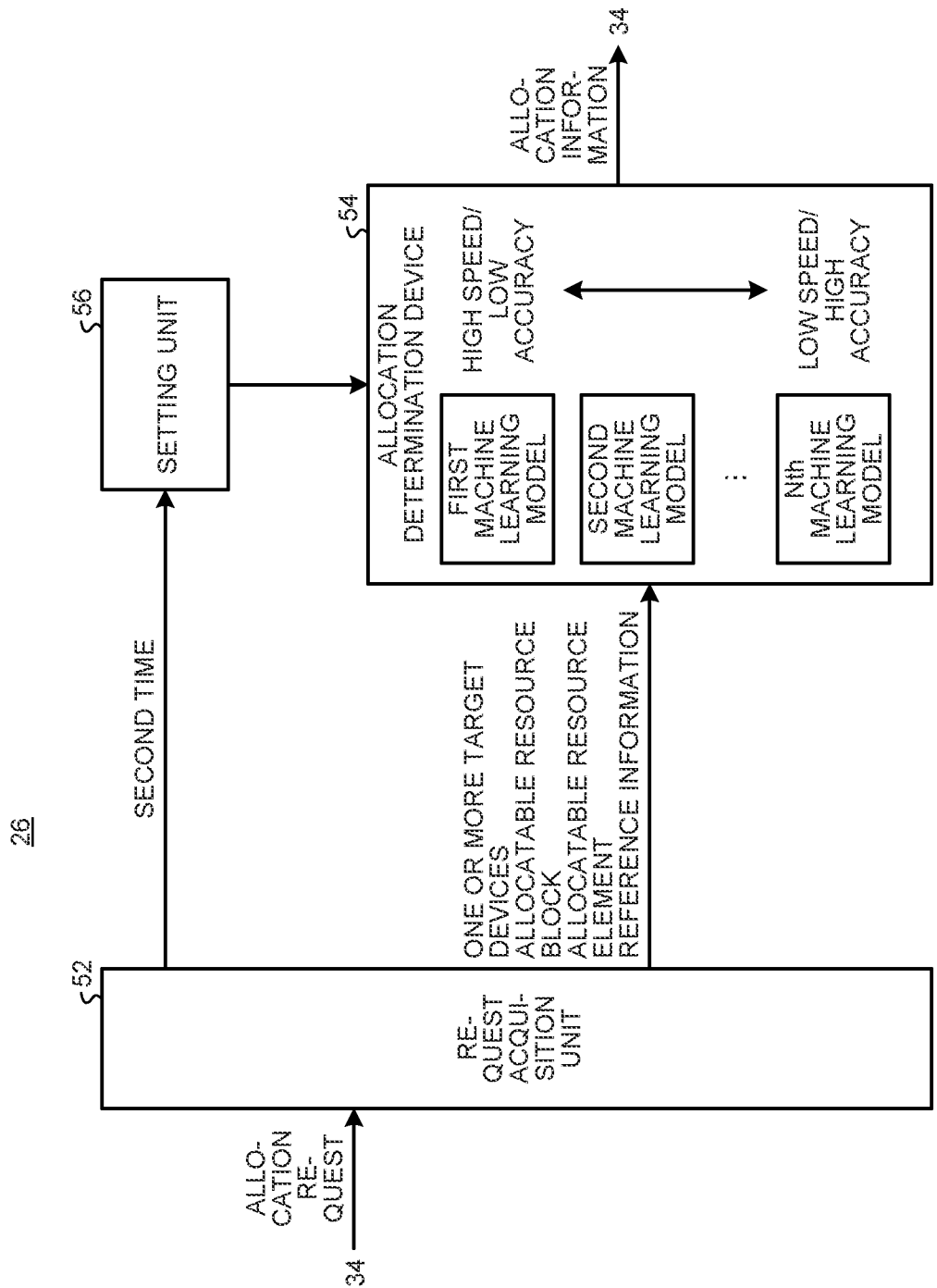
FIG. 13 is a diagram illustrating the configuration of an allocation determination device according to a first embodiment.

FIG. 13 is a diagram illustrating the configuration of the allocation determination device 26 according to a first embodiment. The allocation determination device 26 according to the first embodiment generates the allocation information by using the machine learning model.

The allocation determination device 26 according to the first embodiment includes a request acquisition unit 52, an allocation determination unit 54, and a setting unit 56.

The request acquisition unit 52 acquires the allocation request from the control device 34. The request acquisition unit 52 provides the allocation determination unit 54 with the information indicating the one or more target devices, the information indicating the allocatable communication blocks (allocatable resource blocks and allocatable resource elements), and the reference information included in the allocation request. Furthermore, the request acquisition unit 52 provides the second time included in the allocation request to the setting unit 56.

The allocation determination unit 54 includes a plurality of machine learning models. Each of the machine learning models receives the information indicating the one or more target devices, the information indicating the allocatable communication blocks, and the reference information, and outputs the allocation information. Each of the machine learning models is, for example, a pre-trained neural network.

The machine learning models have different computation times from receiving information to outputting the allocation information. Furthermore, each of the machine learning models is different from the others in an internal computational structure and computational algorithm. For example, when the machine learning models are neural networks, the neural networks have a different number of layers and nodes. Accordingly, the machine learning models are different in the accuracy of actually output allocation information with respect to ideal allocation information to be obtained for input information.

For example, it is assumed that the allocation determination unit 54 includes N machine learning models from a first machine learning model to an Nth (N is an integer of 2 or more) machine learning model. In this case, for example, the first machine learning model is the fastest but least accurate. The Nth machine learning model is the most accurate, but the slowest. From a second machine learning model to an N−1th machine learning model, the speed is gradually decreased and the accuracy is gradually increased.

Such an allocation determination unit 54 returns the allocation information output from the machine learning model to the control device 34.

Upon receiving the allocation request, the setting unit 56 selects, among the machine learning models, a machine learning model that outputs the allocation information by the reply time at which the control device 34 can perform the allocation process by the second time. For example, upon receiving the allocation request, the setting unit 56 selects, among the machine learning models, a machine learning model that outputs the allocation information by the reply time and outputs the most accurate allocation information. Then, the setting unit 56 causes the allocation determination unit 54 to generate the allocation information by using the selected machine learning model.

When the time from the acquisition time of the allocation request to the second time is short, the allocation determination device 26 according to the first embodiment can generate the allocation information by using a machine learning model that is less accurate but performs an operation at high speed. Furthermore, when the time from the acquisition time of the allocation request to the second time is long, the allocation determination device 26 according to the first embodiment can generate the allocation information by using a machine learning model that performs an operation at a low speed but has high accuracy.

As a result, the allocation determination device 26 according to the first embodiment can reliably return allocation information to the control device 34 by the second time, and can return allocation information with higher accuracy.

Figure 14:
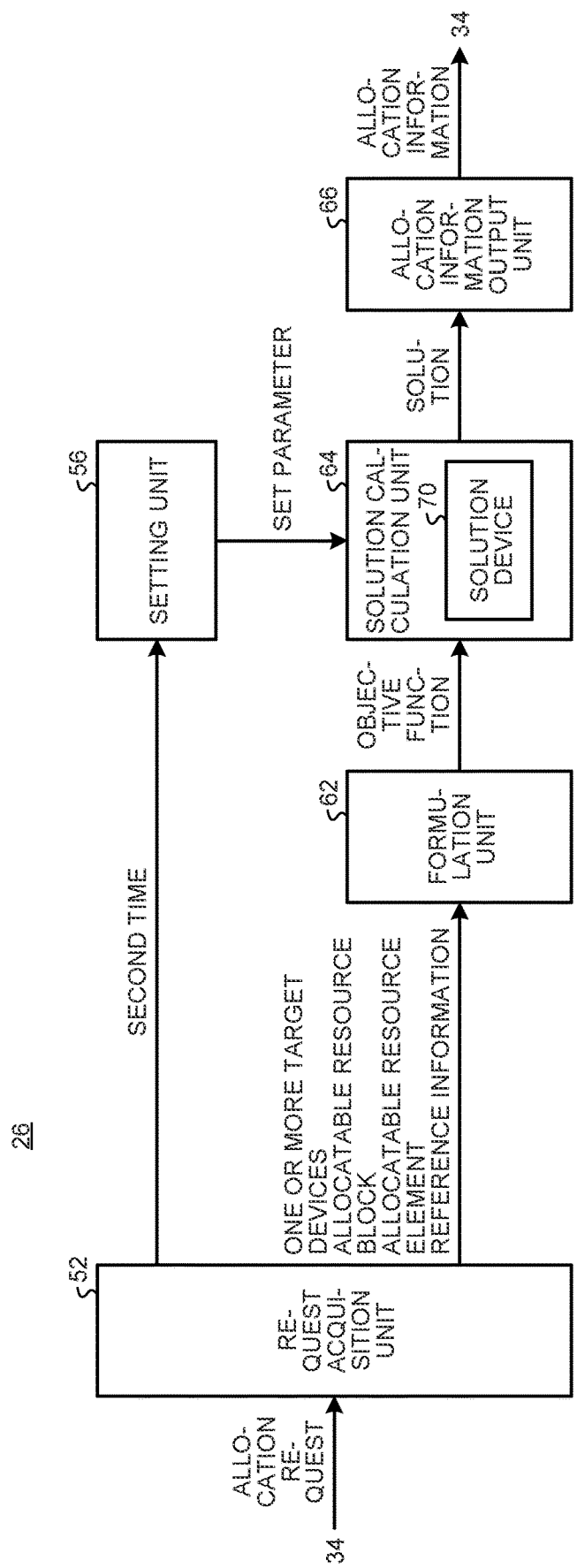
FIG. 14 is a diagram illustrating the configuration of an allocation determination device according to a second embodiment.

FIG. 14 is a diagram illustrating the configuration of the allocation determination device 26 according to a second embodiment. The allocation determination device 26 according to the second embodiment generates the allocation information by solving a QUBO problem.

The allocation determination device 26 according to the second embodiment includes a request acquisition unit 52, a formulation unit 62, a solution calculation unit 64, an allocation information output unit 66, and a setting unit 56.

The request acquisition unit 52 according to the second embodiment acquires the allocation request from the control device 34. The request acquisition unit 52 provides the formulation unit 62 with the information indicating the one or more target devices, the information indicating the allocatable communication blocks (allocatable resource blocks and allocatable resource elements), and the reference information included in the allocation request. Furthermore, the request acquisition unit 52 provides the second time included in the allocation request to the setting unit 56. Based on the information indicating the one or more target devices, the information indicating the allocatable communication blocks, and the reference information, the formulation unit 62 generates an objective function in the QUBO problem according to the formulation algorithm generated in advance by the designer. The QUBO problem is a quadratic function involving a plurality of binary variables. Each of at least a part of the binary variables corresponds to any of the resource elements and to any of the one or more target devices, and represents whether a corresponding target device is allocated to a corresponding resource element. That is, at least a part of the binary variables represents a solution to a box-packing problem representing allocation information. The formulation unit 62 provides the generated objective function to the solution calculation unit 64.

The solution calculation unit 64 receives the objective function generated by the formulation unit 62 and calculates a solution to the QUBO problem by using a solution device 70. The solution device 70 is an example of a QUBO solver and calculates a solution that minimizes the objective function. The solution device 70 may be provided in the allocation determination device 26 or may be provided outside the allocation determination device 26.

The solution device 70 is a device capable of changing the computation time from receiving the objective function to outputting the solution by changing parameter settings. For example, the solution device 70 may be a device for which the longer the computation time is set, the higher the probability of outputting an approximate solution close to an optimum solution, and the shorter the computation time is set, the higher the probability of outputting an approximate solution far from the optimum solution.

For example, the solution device 70 is a device using the simulated bifurcation (SB) algorithm disclosed in Japanese Patent Application Laid-open No. 2019-145010 or Japanese Patent Application Laid-open No. 2020-46887. The solution device 70 using the SB algorithm can change the time until the solution is output by changing a parameter T representing an end time. Details of the solution device 70 using the SB algorithm will be described below.

The allocation information output unit 66 acquires the solution to the QUBO problem from the solution calculation unit 64. The allocation information output unit 66 generates the allocation information based on the solution to the QUBO problem. More specifically, the allocation information output unit 66 acquires some solutions of the binary variables representing the solutions of the box-packing problem among the binary variables included in the objective function, and generates the allocation information. Then, the allocation information output unit 66 returns the generated allocation information to the control device 34.

Upon receiving the allocation request, the setting unit 56 sets a parameter related to the computation time in the solution device 70 based on the second time. More specifically, the setting unit 56 sets the computation time of the solution device 70 so that the allocation information is output by the reply time at which the control device 34 can perform the allocation process by the second time. For example, upon receiving the allocation request, the setting unit 56 sets the computation time of the solution device 70 so that the most accurate allocation information is output in the range where allocation information can be output by the reply time. For example, when the solution device 70 uses the SB algorithm, the setting unit 56 sets the parameter T representing the end time.

When the time from the acquisition time of the allocation request to the second time is short, the allocation determination device 26 according to the second embodiment can generate the allocation information by setting the solution device 70 to perform an operation in a short time, although the accuracy is low. When the time from the acquisition time of the allocation request to the second time is long, the allocation determination device 26 according to the second embodiment can generate the allocation information by setting the solution device 70 to perform an operation in a long time but with high accuracy.

As a result, the allocation determination device 26 according to the second embodiment can reliably return allocation information to the control device 34 by the second time, and can return allocation information with higher accuracy.

Figure 15:
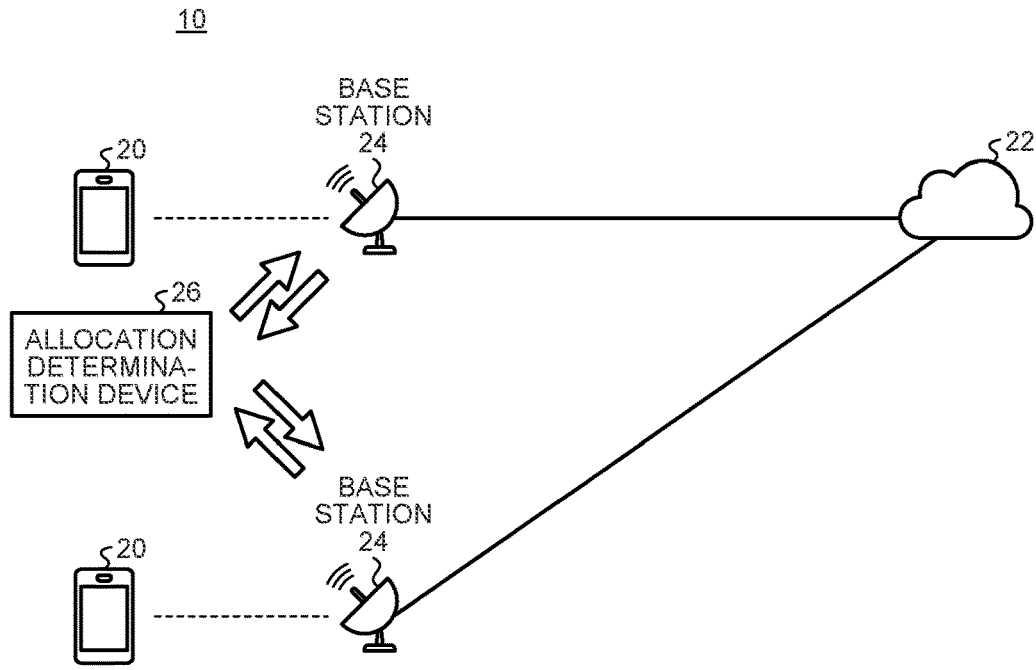
FIG. 15 is a diagram illustrating the configuration of a communication system according to a first modification.

FIG. 15 is a diagram illustrating the configuration of the communication system 10 according to a first modification. The communication system 10 may have a configuration as illustrated in FIG. 15, for example. That is, the allocation determination device 26 may be connected to a plurality of base stations 24. In this case, the allocation determination device 26 accepts allocation requests from the base stations 24. Then, the allocation determination device 26 generates allocation information in response to receiving the allocation requests, and returns the generated allocation information to the base stations 24 having transmitted the allocation requests.

Figure 16:
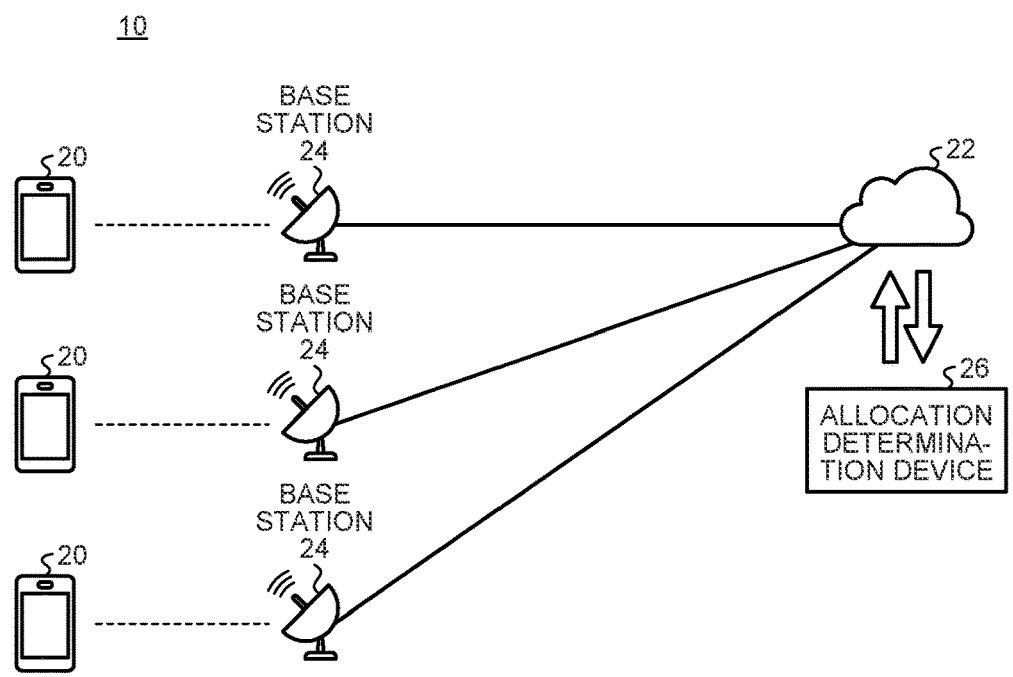
FIG. 16 is a diagram illustrating the configuration of a communication system according to a second modification.

FIG. 16 is a diagram illustrating the configuration of the communication system 10 according to a second modification. The communication system 10 may have a configuration as illustrated in FIG. 16, for example. That is, the allocation determination device 26 is connected to the core network 22. In this case, each of one or more base stations 24 outputs an allocation request to the allocation determination device 26 via the core network 22. Then, the allocation determination device 26 generates allocation information in response to receiving the allocation request, and returns the generated allocation information to the base station 24 having output the allocation request via the core network 22.

Figure 17:
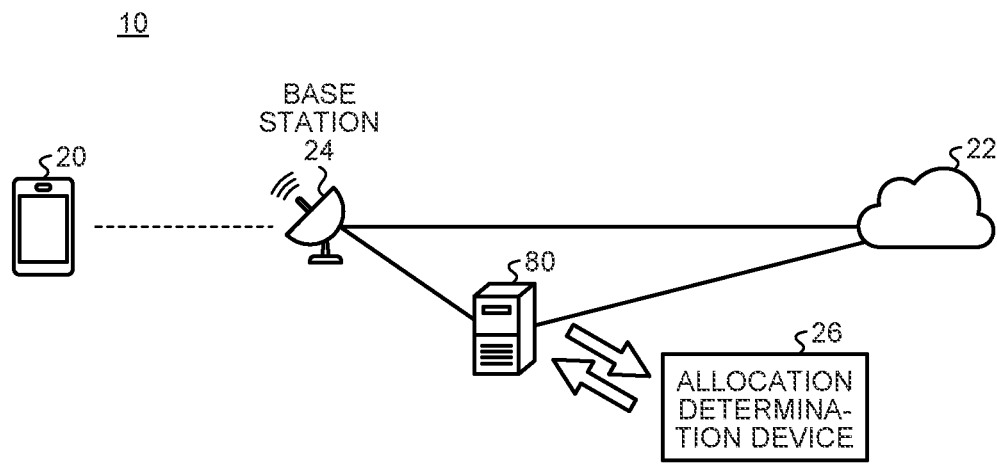
FIG. 17 is a diagram illustrating the configuration of a communication system according to a third modification.

FIG. 17 is a diagram illustrating the configuration of the communication system 10 according to a third modification. The communication system 10 may have a configuration as illustrated in FIG. 17, for example. That is, the communication system 10 may further include a relay device 80. The relay device 80 in the third modification relays transmission and reception of information between the base station 24 and the allocation determination device 26. Moreover, the relay device 80 acquires a part of reference information necessary for generating allocation information from the core network 22. In this case, the base station 24 outputs an allocation request to the allocation determination device 26 via the relay device 80. Then, in response to receiving the allocation request, the relay device 80 acquires a part of information included in the reference information from the core network 22, and transmits an allocation request including the acquired information to the allocation determination device 26. Then, the allocation determination device 26 generates allocation information in response to receiving the allocation request, and returns the generated allocation information to the base station 24 via the relay device 80.

Figure 18:
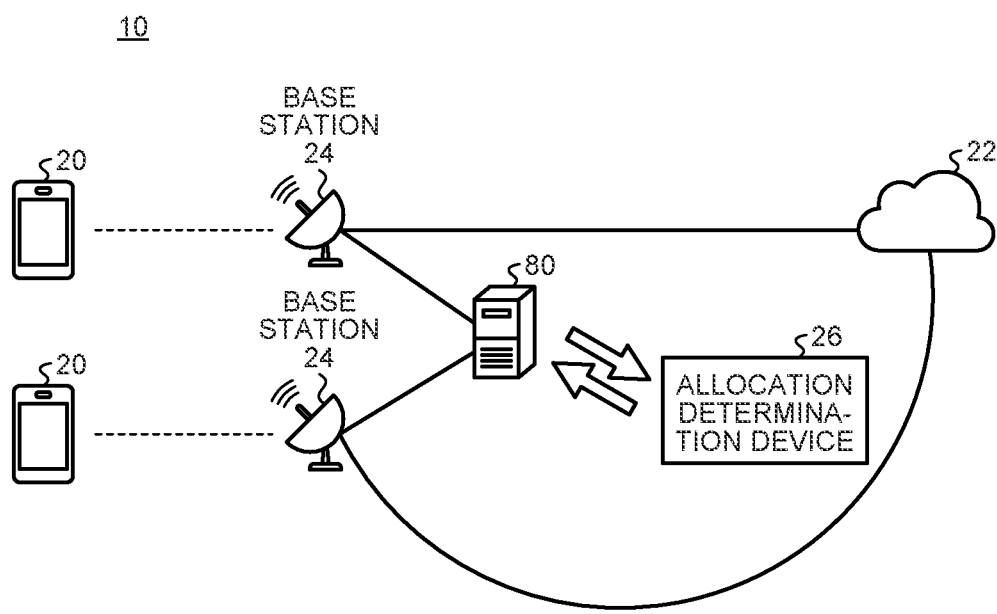
FIG. 18 is a diagram illustrating the configuration of a communication system according to a fourth modification.

FIG. 18 is a diagram illustrating the configuration of the communication system 10 according to a fourth modification. The communication system 10 may have a configuration as illustrated in FIG. 18, for example. That is, the communication system 10 may further include a relay device 80. The relay device 80 in the fourth modification relays transmission and reception of information between each of a plurality of base stations 24 and the allocation determination device 26. In this case, each of the base stations 24 outputs an allocation request to the allocation determination device 26 via the relay device 80. Then, the allocation determination device 26 generates allocation information in response to receiving the allocation request, and returns the generated allocation information to the base station 24 having output the allocation request via the relay device 80.

Figure 19:
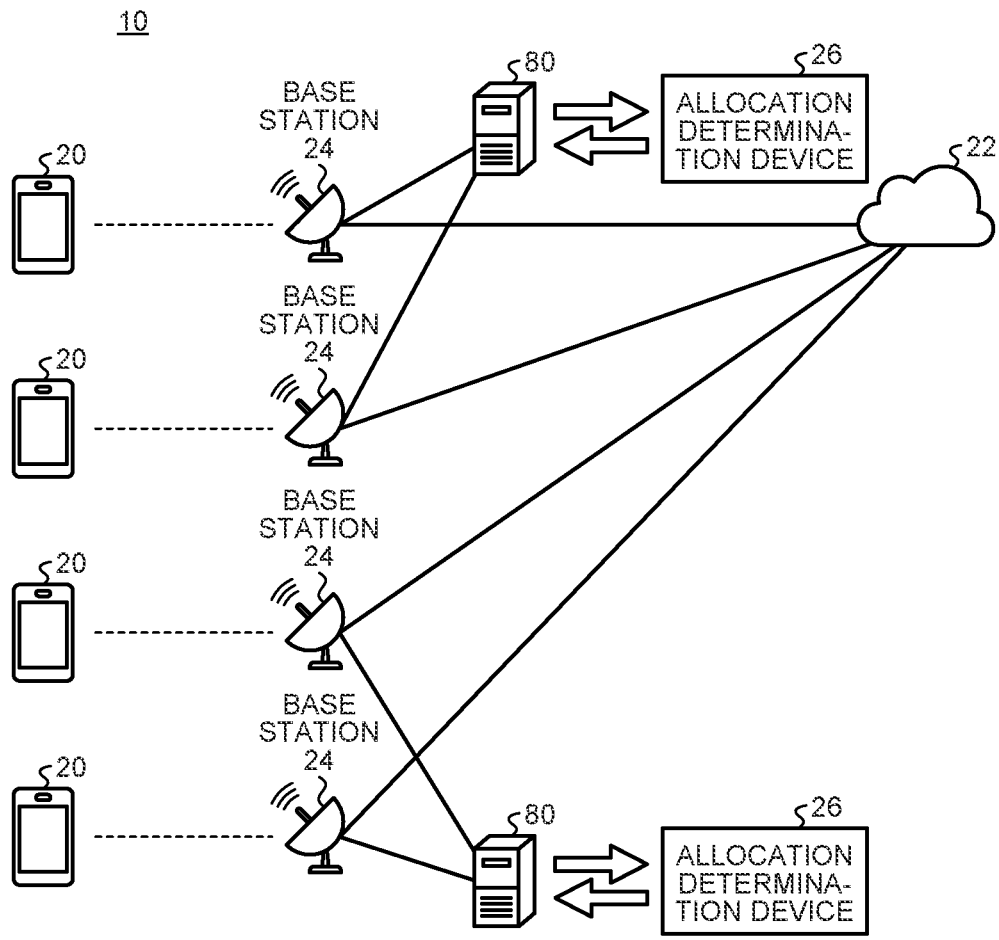
FIG. 19 is a diagram illustrating the configuration of a communication system according to a fifth modification.

FIG. 19 is a diagram illustrating the configuration of the communication system 10 according to a fifth modification. The communication system 10 may have a configuration as illustrated in FIG. 19, for example. That is, the communication system 10 may further include a plurality of relay devices 80. Furthermore, the communication system 10 includes a plurality of allocation determination devices 26 corresponding to the relay devices 80 in a one-to-one manner. The relay device 80 in the fifth modification relays transmission and reception of information between each of corresponding base stations 24 and a corresponding allocation determination device 26. In this case, each of the base stations 24 outputs an allocation request to a corresponding allocation determination device 26 via a corresponding relay device 80. Then, the allocation determination device 26 generates allocation information in response to receiving the allocation request, and returns the generated allocation information to the base station 24 having output the allocation request via a corresponding relay device 80.

Solution Device 70 Using SB Algorithm

Next, the solution device 70 that executes the SB algorithm will be described.

As a premise for the description of the solution device 70, first, an Ising problem and a QUBO problem will be described.

An example of a device used to solve the Ising problem includes an Ising machine. The Ising machine calculates the energy of a ground state of an Ising model. Until now, Ising models have often been used mainly as models for ferromagnets and phase transition phenomena. However, in recent years, the Ising model has been increasingly used as a model for solving the QUBO problem. Equation (1) below indicates the energy of the Ising model.

$$E_{Ising} = -\sum_{i=1}^{N} h_i s_i - \frac{1}{2}\sum_{i=1}^{N}\sum_{j=1}^{N} J_{i,j} s_i s_j \qquad (1)$$

$s_i$ and $s_j$ denote spins. The spin is a binary variable that takes a value of either +1 or −1. $s_i$ represents an ith spin. $s_j$ represents a jth spin. i and j are integers of 1 through N, both inclusive. N represents the number of spins and is an integer of 2 or more. $h_i$ represents a local magnetic field acting on the ith spin. J is a matrix of coupling coefficients representing a force acting between two spins. J is a real symmetric matrix having zero diagonal components. $J_{ij}$ represents an element in i row and j column of J. That is, $J_{ij}$ is a coupling coefficient representing a force acting between the ith spin and the jth spin.

The Ising machine uses energy $E_{Ising}$ expressed by equation (1) above as an objective function and calculates a solution that reduces the energy $E_{Ising}$ as much as possible. The solution $(s_1, s_2, \ldots, s_N)$ of the Ising model for which the energy $E_{Ising}$ is a minimum value is called an optimum solution. However, the solution of the Ising model may not be the optimum solution, but an approximate solution for which the energy $E_{Ising}$ is close to the minimum value. That is, the Ising problem may be a problem of calculating the approximate solution as well as the optimum solution.

Furthermore, the QUBO problem uses a quadratic function of a binary variable having a value of either 0 or 1 as an objective function. A binary variable having a value of either 0 or 1 is converted into $s_i$ by using an operation $(1+s_i)/2$. That is, the QUBO problem may be equivalent to the Ising problem expressed by equation (1) above. Accordingly, the QUBO problem can be converted into the Ising problem and the solution can be calculated by the Ising machine.

Japanese Patent Application Laid-open No. 2019-145010 and Japanese Patent Application Laid-open No. 2020-46887 propose an SB algorithm as an algorithm for solving the QUBO problem. The SB algorithm can solve a large-scale QUBO problem at high speed by a digital computer by using the Ising model. The SB algorithm can also solve a large-scale QUBO problem at high speed by an electronic circuit such as a central processing unit (CPU), a microprocessor, a graphics processing unit (GPU), a field-programmable gate array (FPGA), an application specific integrated circuit (ASIC), or a circuit of a combination thereof.

Next, the SB algorithm will be described.

The SB algorithm uses a variable $x_i$ and a variable $y_i$ each corresponding to N elements. The variable $x_i$ may also be referred to as a first variable and the variable $y_i$ may also be referred to as a second variable. In the SB algorithm, each of the N elements represents a virtual particle. The N elements correspond to N spins of the Ising problem. Accordingly, the N elements correspond to N binary variables of the QUBO problem. Both the variable $x_i$ and the variable $y_i$ are continuous variables expressed by real numbers. The variable $x_i$ represents the position of an ith particle among the N particles. The variable $y_i$ represents the momentum of the ith particle. N is an integer of 2 or more. i represents an integer of 1 through N, both inclusive, and represents an index that specifies each of the N elements.

The SB algorithm numerically solves simultaneous ordinary differential equations of the following equation (2) for N variables $x_i$ and N variables $y_i$.

$$\frac{dx_i}{dt} = \frac{\partial H}{\partial y_i} = Dy_i \qquad (2)$$

$$\frac{dy_i}{dt} = \frac{\partial H}{\partial x_i} = \{-D + p(t) - Kx_i^2\}x_i + f_i$$

H is a Hamiltonian of the following equation (3).

$$H = \sum_{i=1}^{N}\left[\frac{D}{2}(x_i^2 + y_i^2) - \frac{p(t)}{2}x_i^2 + \frac{K}{4}x_i^4 - c\left(h_i x_i \alpha(t) + \frac{1}{2}\sum_{j=1}^{N} J_{i,j} x_i x_j\right)\right] \qquad (3)$$

A coefficient D is a predetermined constant and corresponds to detuning. A coefficient p(t) corresponds to a pumping amplitude, and has a value that increases monotonically with the number of updates when the SB algorithm is calculated. t is a variable representing time. The initial value of the coefficient p(t) may be set to 0. A coefficient K is a predetermined constant and corresponds to a positive Kerr coefficient. Note that the coefficient K may be zero.

$f_i$ represents an external force and is expressed by the following equation (4).

$$f_i = -cz_i \quad (4)$$

$$z_i = -h_i\alpha(t) - \sum_{j=1}^{N} J_{i,j}x_j$$

In equation (4) above, $z_i$ is a formula obtained by partially differentiating the formula in the small parentheses in the equation (3) above with the variable $x_i$. The formula in the small parentheses in the equation (3) above corresponds to the energy $E_{Ising}$ of the Ising model.

c is a coefficient. c may be, for example, a constant predetermined before the calculation is performed. Furthermore, $\alpha(t)$ is a coefficient that increases with p(t).

Then, the SB algorithm calculates the value of the spin $s_i$ based on the sign of the variable $x_i$ after the value of p(t) is increased from an initial value (for example, 0) to a predetermined value. The SB algorithm calculates the value of the spin $s_1$ by using, for example, a sign function where $sgn(x_i)=1$ when $x_i>0$ and $sgn(x_i)=-1$ when $x_i<0$.

The SB algorithm solves the differential equations given by equations (2), (3) and (4) above by using a symplectic Euler method.

When the symplectic Euler method is used, the differential equations given by equations (2), (3) and (4) above are rewritten as discrete recurrence formulas as expressed by equations (5) or (6) below.

$$x_i(t+\Delta t) = x_i(t) + Dy_i(t)\Delta t$$

$$y_i(t+\Delta t) = y_i(t) + [\{-D+p(t+\Delta t)-Kx_i^2(t+\Delta t)\}x_i(t+\Delta t)+f_i(t+\Delta t)]\Delta t$$

$$f_i(t+\Delta t) = -cz_i(t+\Delta t) \quad (5)$$

$$y_i(t+\Delta t) = y_i(t) + [\{-D+p(t)-Kx_i^2(t)\}x_i(t)+f_i(t)]\Delta t$$

$$x_i(t+\Delta t) = x_i(t) + Dy_i(t+\Delta t)$$

$$f_i(t) = -cZ_i(t) \quad (6)$$

t denotes time. $\Delta t$ represents a unit time (time step or time step width).

When executing the SB algorithm, the digital computer or the electronic circuit such as FPGA updates the N variables $x_i$ and the N variables $y_i$ sequentially from the initial time every unit time, and alternately updates the variable $x_i$ and the variable $y_i$, based on the algorithm of equation (5) or equation (6) above. Then, the digital computer or the electronic circuit such as FPGA binarizes the values of the N variables $x_i$ at the end time by using a sign function and outputs the values of the N spins.

Note that equation (5) or equation (6) above are expressed using time t and unit time $\Delta t$ to show the correspondence relationship with the differential equation. However, when the symplectic Euler method is performed in the digital computer or the electronic circuit such as FPGA, the algorithm for computing equation (5) or equation (6) above may not include the time t and the unit time $\Delta t$ as explicit parameters. For example, when the unit time $\Delta t$ is set to 1, the algorithm for computing equation (5) or equation (6) above may not include the unit time $\Delta t$. For example, when the time t is not included as an explicit parameter, the algorithm for computing equation (5) or equation (6) above performs a process with $x_i(t+\Delta t)$ as an updated value of $x_i(t)$. That is, the algorithm for calculating equation (5) or equation (6) above performs the process with "t" as a parameter for specifying a variable before the update and "t+$\Delta t$" as a parameter for specifying a variable after the update.

Figure 20:
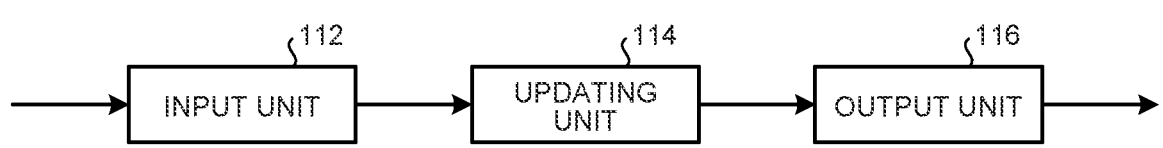
FIG. 20 is a diagram illustrating an example of the configuration of a solution device.

FIG. 20 is a diagram illustrating the functional configuration of the solution device 70 that executes the SB algorithm.

As illustrated in FIG. 20, the solution device 70 includes an input unit 112, an updating unit 114, and an output unit 116 as a functional configuration.

The input unit 112 receives, from an external device, information (for example, N, J, and h) for defining the objective function of the QUBO problem and information (for example, D, c, $\Delta t$, T, p(t), and $\alpha(t)$) representing coefficients required for executing the SB algorithm.

Note that T represents the end time. In the present embodiment, the input unit 112 receives T representing the end time from the setting unit 56.

The updating unit 114 uses the SB algorithm and alternately updates the first variable $x_i$ and the second variable $y_i$ sequentially for each unit time $\Delta t$ from the initial time (t=0) to the end time (t=T) with respect to each of the elements with which the first variable $x_i$ and the second variable $y_i$ are correlated.

The output unit 116 outputs the solution to the QUBO problem based on the first variable $x_i$ of each of the elements at the end time (t=T). For example, for each of the elements at the end time, the output unit 116 calculates the value of a binary variable obtained by binarizing the first variable $x_i$ with a preset threshold value. Then, the output unit 116 outputs the calculated values of the binary variables as the solution to the QUBO problem.

The elements correspond to the binary variables in the QUBO problem. Furthermore, each of the first variable $x_i$ and the second variable $y_i$ is represented by a real number.

In the update process for each unit time, the updating unit 114 updates the first variable $x_i$ based on the second variable $y_i$ for each of the elements. In the update process for each unit time, the updating unit 114 updates the second variable $y_i$ based on the first variable $x_i$ for each of the elements.

For example, in the update process for each unit time, the updating unit 114 updates the second variable $y_i$ after updating the first variable $x_i$ for each of the elements. Alternatively, in the update process for each unit time, the updating unit 114 may update the first variable $x_i$ after updating the second variable $y_i$ for each of the elements.

Figure 21:
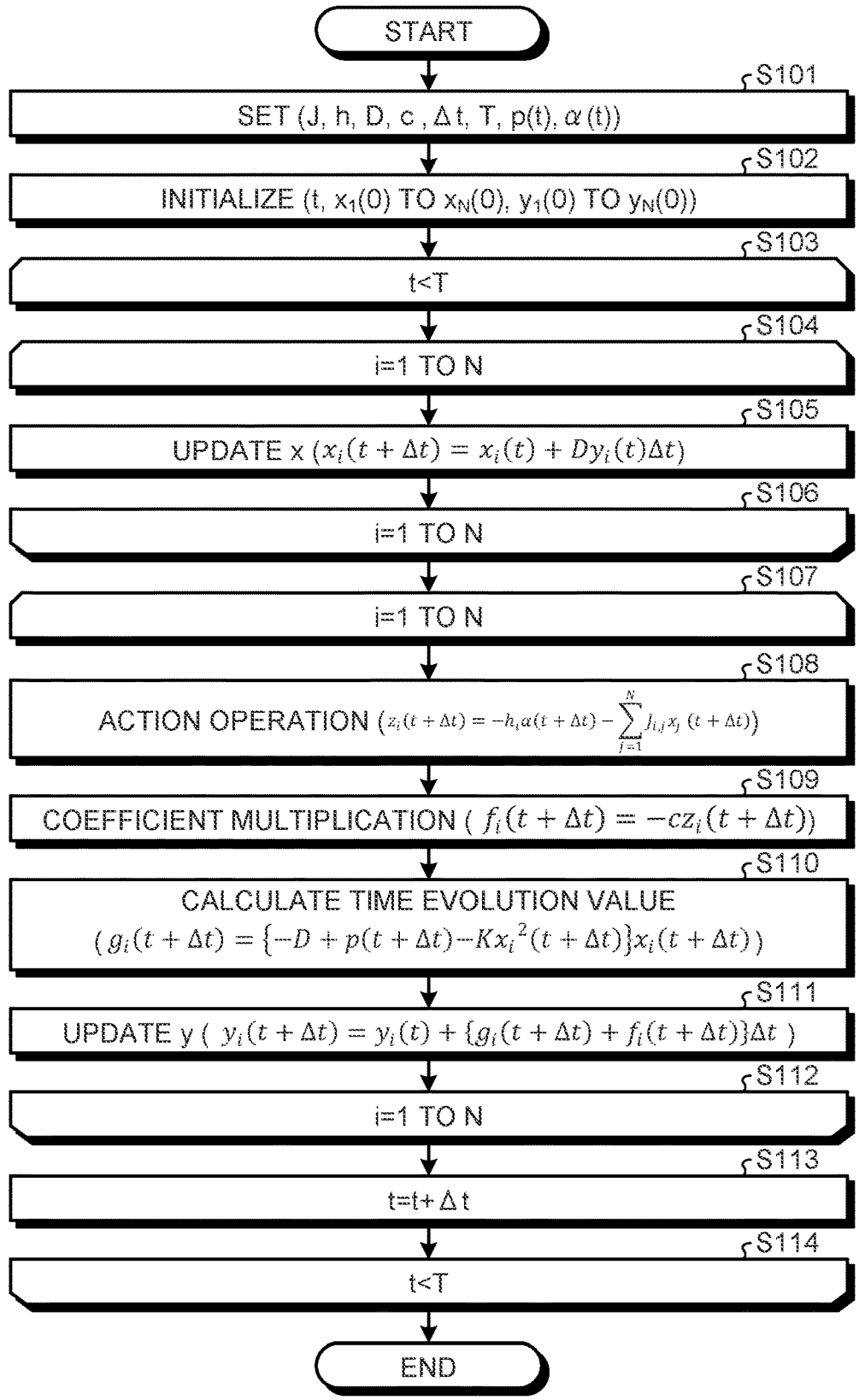
FIG. 21 is a flowchart illustrating a first embodiment of a processing flow of an updating unit.

FIG. 21 is a flowchart illustrating a first embodiment of the processing flow of the updating unit 114. The updating unit 114 performs the process according to the flow illustrated in FIG. 21, for example.

First, at S101, the updating unit 114 sets parameters for solving the QUBO problem. Specifically, the updating unit 114 sets J, which is a matrix including N×N coupling coefficients, and h, which is an array including local magnetic field coefficients representing N local magnetic fields. Moreover, the updating unit 114 sets D as a coefficient, c as a coefficient, $\Delta t$ representing the unit time, T representing the end time, p(t) as a function, and $\alpha(t)$ as a function. p(t) and $\alpha(t)$ are increasing functions for which t=0 at the initial time (for example, 0) and t=1 at the end time T. The updating unit 114 sets J and h according to the information received from the input unit 112. The updating unit 114 may set D, c, $\Delta t$, p(t), and $\alpha(t)$ according to values received from the input unit 112, or may set values that are pre-determined and are not changeable. Note that in the present embodiment, T is a value determined according to the second time set from the setting unit 56 and is changed each time the QUBO problem is performed.

Subsequently, at S102, the updating unit 114 initializes the variables. Specifically, the updating unit 114 initializes t, which is a variable representing time, to the initial time (for example, 0). Moreover, the updating unit 114 substitutes an initial value received from a user, a predetermined fixed value, or a random number into each of N first variables $x_1(t)$ to $x_N(t)$ and each of N second variables $y_1(t)$ to $y_N(t)$.

Subsequently, the updating unit 114 repeats a loop process from S103 to S114 until t becomes larger than T. In one loop process, the updating unit 114 calculates N first variables $x_1(t+\Delta t)$ to $x_N(t+\Delta t)$ at the target time $t+\Delta t$ based on the N first variables $x_1(t)$ to $x_N(t)$ at the immediately preceding time t and the N second variables $y_1(t)$ to $y_N(t)$ at the immediately preceding time t. Furthermore, in one loop process, the updating unit 114 calculates N second variables $y_1(t+\Delta t)$ to $y_N(t+\Delta t)$ at the target time $t+\Delta t$ based on the N first variables $x_1(t+\Delta t)$ to $x_N(t+\Delta t)$ at the target time $t+\Delta t$ and the N second variables $y_1(t)$ to $y_N(t)$ at the immediately preceding time t.

Note that the immediately preceding time t is a time before the unit time $\Delta t$ from the target time $t+\Delta t$. That is, by repeating the loop process from S103 to S114, the updating unit 114 sequentially updates the N first variables $x_1(t)$ to $x_N(t)$ and the N second variables $y_1(t)$ to $y_N(t)$ every unit time $\Delta t$ from the initial time (t=0) to the end time (t=T).

Subsequently, the updating unit 114 repeats a loop process from S104 to S106 while incrementing i by 1 from i=1 to i=N. i is an integer from 1 to N and is an index representing a processing target among the N elements. The first variable $x_i(t)$ and the second variable $y_i(t)$ are correlated with each of the N elements. In the loop process from S104 to S106, the updating unit 114 performs the process with an ith element among the N elements as a target element.

At S105, the updating unit 114 calculates the first variable $x_i(t+\Delta t)$ at the target time $t+\Delta t$ of the target element by adding a value to the first variable $x_i(t)$ at the immediately preceding time t of the target element, the value being obtained by multiplying the second variable $y_i(t)$ at the immediately preceding time t of the target element by the predetermined constant D and the unit time $\Delta t$. Specifically, the updating unit 114 calculates equation (7) below.

$$x_i(t+\Delta t)=x_i(t)+Dy_i(t)\Delta t \quad (7)$$

That is, for each of the N elements, the updating unit 114 updates the first variable $x_i(t+\Delta t)$ at the target time $t+\Delta t$ of the target element based on the first variable $x_i(t)$ at the immediately preceding t of the target element and the second variable $y_i(t)$ at the immediately preceding time t of the target element.

When the updating unit 114 performs the loop process from S104 to S106 N times, the process proceeds to S107.

Subsequently, the updating unit 114 repeats a loop process from S107 to S112 while incrementing i by 1 from i=1 to i=N.

At S108, the updating unit 114 calculates an updated value $z_i(t+\Delta t)$ based on the first variable $x_1(t+\Delta t)$ to $x_N(t+\Delta t)$ at the target time $t+\Delta t$ for each of the N elements and action coefficients predetermined by the QUBO problem for each pair of the target element and each of the N elements. The action coefficients are the coupling coefficient included in J and the local magnetic field coefficient included in h. Specifically, the updating unit 114 calculates equation (8) below.

$$z_i(t+\Delta t) = -h_i\alpha(t+\Delta t) - \sum_{j=1}^{N} J_{i,j}x_j(t+\Delta t) \quad (8)$$

Subsequently, at S109, the updating unit 114 calculates an external force $f_i(t+\Delta t)$ by multiplying the updated value $z_i(t+\Delta t)$ by the coefficient c and −1. Specifically, the updating unit 114 calculates equation (9) below.

$$f_i(t+\Delta t)=-cz_i(t+\Delta t) \quad (9)$$

Subsequently, at S110, the updating unit 114 calculates a time evolution value $g_i(t+\Delta t)$ obtained by multiplying a value determined based on $p(t+\Delta t)$, which is a function that increases over time, by the first variable $x_1(t+\Delta t)$ at the target time $(t+\Delta t)$ of the target element. Specifically, the updating unit 114 calculates equation (10) below.

$$g_i(t+\Delta t)=\{-D+p(t+\Delta t)-Kx_i^2(t+\Delta t)\}x_i(t+\Delta t) \quad (10)$$

Subsequently, at S111, the updating unit 114 calculates the second variable $y_i(t+\Delta t)$ at the target time $t+\Delta t$ of the target element by adding a value to the second variable $y_i(t)$ at the immediately preceding time t of the target element, the value being obtained by multiplying, by the unit time $\Delta t$, a value obtained by adding the time evolution value $g_i(t+\Delta t)$ and the external force $f_i(t+\Delta t)$. Specifically, the updating unit 114 calculates equation (11) below.

$$y_i(t+\Delta t)=y_i(t)+\{g_i(t+\Delta t)+f_i(t+\Delta t)\}\Delta t \quad (11)$$

By performing the above loop process from S107 to S112 N times, the updating unit 114 updates the second variable $y_i(t+\Delta t)$ at the target time $t+\Delta t$ for each of the N elements based on the N first variables $x_1(t+\Delta t)$ to $x_N(t+\Delta t)$ at the target time $t+\Delta t$ and the second variable $y_i(t)$ at the immediately preceding time t of the target element.

When the updating unit 114 performs the loop process from S107 to S112 N times, the process proceeds to S113.

At S113, the updating unit 114 updates the immediately preceding time t and the target time $t+\Delta t$ by adding the unit time $\Delta t$ to each of the immediately preceding time t and the target time $t+\Delta t$. At S114, the updating unit 114 repeats the process from S104 to S113 until t exceeds the end time T. Then, when t becomes larger than the end time T, the updating unit 114 ends this flow.

Then, for each of the N elements, the output unit 116 calculates a value of a corresponding spin according to the sign of the first variable $x_i(T)$ at the end time (t=T). For example, when the sign of the first variable $x_i(T)$ at the end time (t=T) is negative, the output unit 116 sets the corresponding spin to −1, and when the sign of the first variable $x_i(T)$ at the end time (t=T) is positive, the output unit 116 sets the corresponding spin to +1. Then, the output unit 116 outputs, as the solution to the QUBO problem, the calculated values of the spins or the values obtained by converting the calculated values of the spins into binary variables.

By performing the above process from S101 to S114, the updating unit 114 can calculate the N first variables $x_1(t)$ to $x_N(t)$ and the N second variables $y_1(t)$ to $y_N(t)$ at the end time (t=T) by performing the operation according to the SB algorithm.

Figure 22:
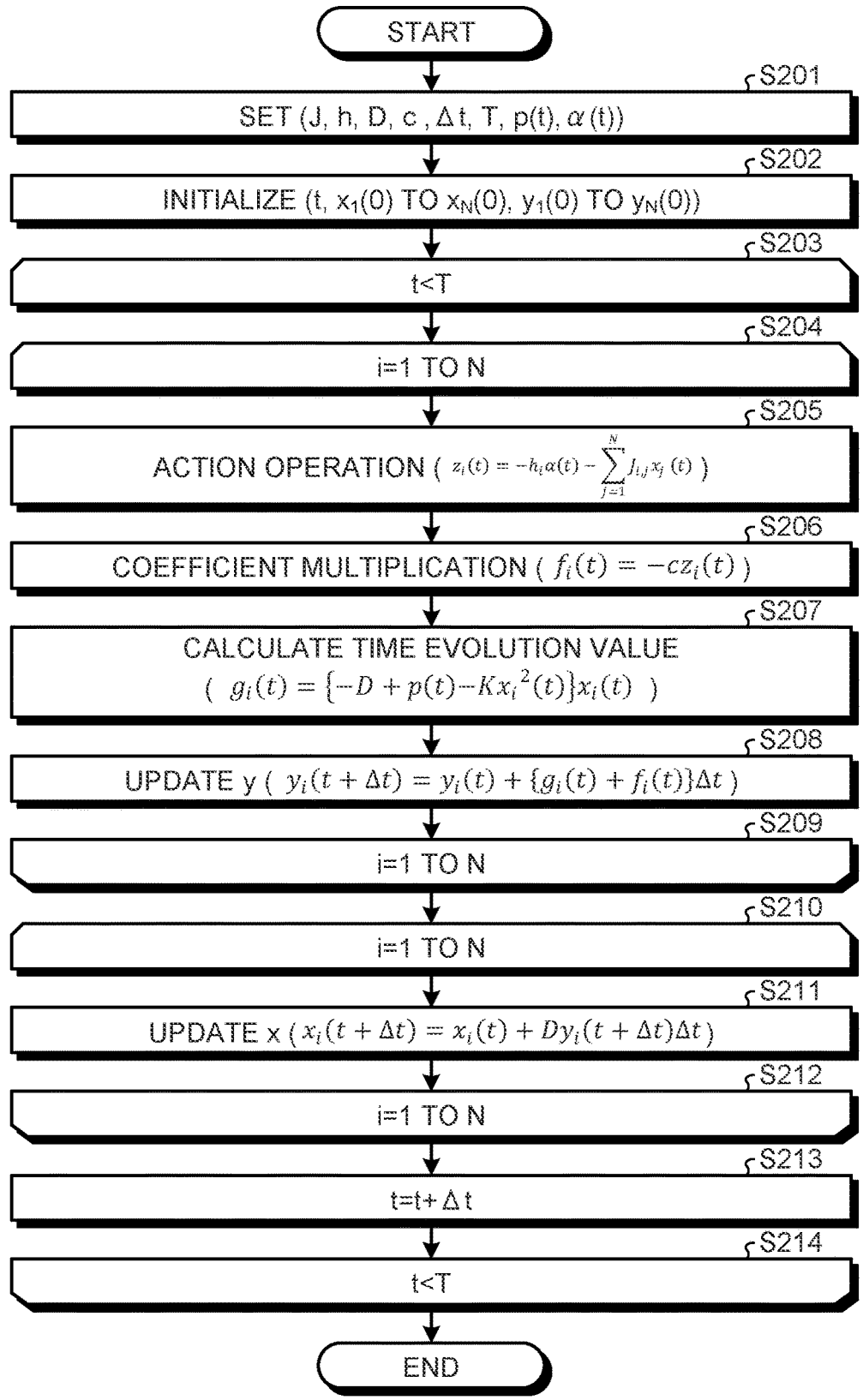
FIG. 22 is a flowchart illustrating a second embodiment of a processing flow of an updating unit.

FIG. 22 is a flowchart illustrating a second embodiment of the processing flow of the updating unit 114. When solving the QUBO problem by using the SB algorithm, the updating unit 114 may perform the process according to the flow illustrated in FIG. 22 instead of the flow illustrated in FIG. 21.

First, at S201 and S202, the updating unit 114 performs the same process as S101 and S102 of the first embodiment illustrated in FIG. 21.

Subsequently, the updating unit 114 repeats a loop process from S203 to S214 until t becomes larger than T. In one loop process, the updating unit 114 calculates the N second variables $y_1(t+\Delta t)$ to $y_N(t+\Delta t)$ at the target time $t+\Delta t$ based on the N first variables $x_1(t)$ to $x_N(t)$ at the immediately preceding time t and the N second variables $y_1(t)$ to $y_N(t)$ at the immediately preceding time t. Furthermore, in one loop process, the updating unit 114 calculates the N first variables $x_1(t+\Delta t)$ to $x_N(t+\Delta t)$ at the target time $t+\Delta t$ based on the N first variables $x_1(t)$ to $x_N(t)$ at the immediately preceding time t and the N second variables $y_1(t+\Delta t)$ to $y_N(t+\Delta t)$ at the target time $(t+\Delta t)$.

Subsequently, the updating unit 114 repeats a loop process from S204 to S209 while incrementing i by 1 from i=1 to i=N. In the loop process from S204 to S209, the updating unit 114 performs the process with the ith element among the N elements as a target element.

At S205, the updating unit 114 calculates an updated value $z_i(t)$ based on the first variables $x_1(t)$ to $x_N(t)$ at the immediately preceding time t for each of the N elements and action coefficients predetermined by the QUBO problem for each pair of the target element and each of the N elements. Specifically, the updating unit 114 calculates equation (12) below.

$$z_i(t) = -h_i \alpha(t) - \sum_{j=1}^{N} J_{i,j} x_j(t) \tag{12}$$

Subsequently, at S206, the updating unit 114 calculates an external force $f_i(t)$ by multiplying the updated value $z_i(t)$ by the coefficient (c) and −1. Specifically, the updating unit 114 calculates equation (13) below.

$$f_i(t) = -c z_i(t) \tag{13}$$

Subsequently, at S207, the updating unit 114 calculates a time evolution value $g_i(t)$ obtained by multiplying a value determined based on p(t), which is a function that increases over time, by the first variable $x_1(t)$ at the immediately preceding time t of the target element. Specifically, the updating unit 114 calculates equation (14) below.

$$g_i(t) = \{-D + p(t) - K x_i^2(t)\} x_i(t) \tag{14}$$

Subsequently, at S208, the updating unit 114 calculates the second variable $y_i(t+\Delta t)$ at the target time $t+\Delta t$ of the target element by adding a value to the second variable $y_i(t)$ at the immediately preceding time t of the target element, the value being obtained by multiplying, by the unit time $\Delta t$, a value obtained by adding the time evolution value $g_i(t)$ and the external force $f_i(t)$. Specifically, the updating unit 114 calculates equation (15) below.

$$y_i(t+\Delta t) = y_i(t) + \{g_i(t) + f_i(t)\} \Delta t \tag{15}$$

By performing the above loop process from S204 to S209 N times, the updating unit 114 updates the second variable $y_i(t+\Delta t)$ at the target time $t+\Delta t$ for each of the N elements based on the N first variables $x_1(t)$ to $x_N(t)$ at the immediately preceding time t and the second variable $y_i(t)$ at the immediately preceding time t of the target element.

When the updating unit 114 performs the loop process from S204 to S209 N times, the process proceeds to S210.

Subsequently, the updating unit 114 repeats a loop process from S210 to S212 while incrementing i by 1 from i=1 to i=N.

At S211, the updating unit 114 calculates the first variable $x_i(t+\Delta t)$ at the target time $t+\Delta t$ of the target element by adding a value to the first variable $x_i(t)$ at the immediately preceding time t of the target element, the value being obtained by multiplying the second variable $y_i(t+\Delta t)$ at the target time $t+\Delta t$ of the target element by the predetermined constant D and the unit time $\Delta t$. Specifically, the updating unit 114 calculates equation (16) below.

$$x_i(t+\Delta t) = x_i(t) + D y_i(t+\Delta t) \Delta t \tag{16}$$

That is, for each of the N elements, the updating unit 114 updates the first variable $x_i(t+\Delta t)$ at the target time $t+\Delta t$ of the target element based on the first variable $x_i(t)$ at the immediately preceding t of the target element and the second variable $y_i(t)$ at the immediately preceding time t of the target element.

When the updating unit 114 performs the loop process from S210 to S212 N times, the process proceeds to S213.

At S213, the updating unit 114 updates the immediately preceding time t and the target time $t+\Delta t$ by adding the unit time $\Delta t$ to each of the immediately preceding time t and the target time $t+\Delta t$. At S214, the updating unit 114 repeats the process from S210 to S213 until t exceeds the end time T. Then, when t becomes larger than the end time T, the updating unit 114 ends this flow.

Then, for each of the N elements, the output unit 116 calculates a value of a corresponding spin according to the sign of the first variable $x_i(T)$ at the end time (t=T). For example, when the sign of the first variable $x_i(T)$ at the end time (t=T) is negative, the output unit 116 sets the corresponding spin to −1, and when the sign of the first variable $x_i(T)$ at the end time (t=T) is positive, the output unit 116 sets the corresponding spin to +1. Then, the output unit 116 outputs, as the solution to the QUBO problem, the calculated values of the spins or the values obtained by converting the calculated values of the spins into binary variables.

By performing the above process from S201 to S214, the updating unit 114 can calculate the N first variables $x_1(t+\Delta t)$ to $x_N(t+\Delta t)$ and the N second variables $y_1(t)$ to $y_N(t)$ at the end time (t=T) by performing the operation according to the SB algorithm.

Hardware Configuration

Figure 23:
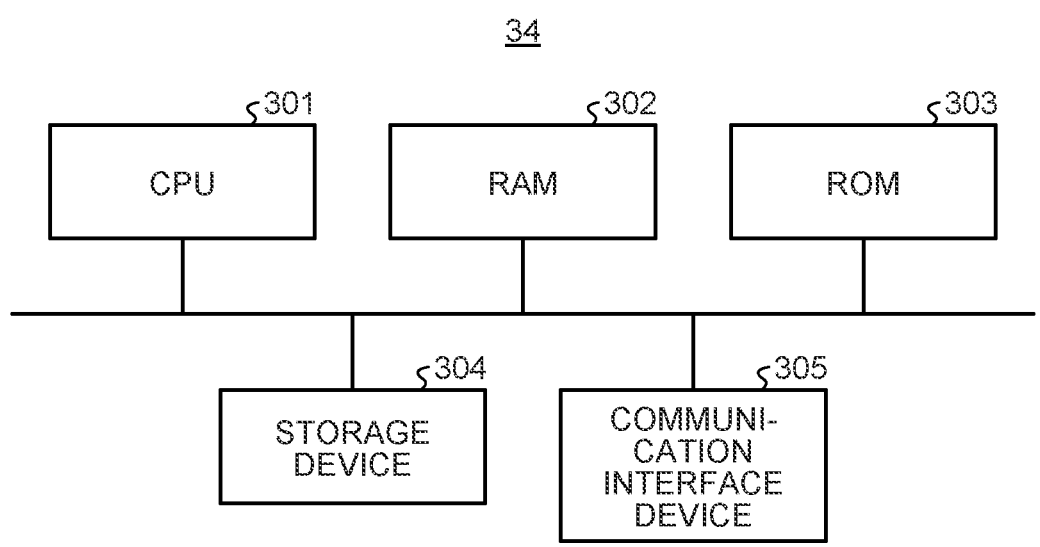
FIG. 23 is a diagram illustrating an example of the hardware configuration of a control device.

FIG. 23 is a diagram illustrating an example of the hardware configuration of the control device 34. The control device 34 is implemented by a computer having the hardware configuration as illustrated in FIG. 23, for example. The control device 34 includes a CPU 301, a random access memory (RAM) 302, a read only memory (ROM) 303, a storage device 304, and a communication interface device 305. These parts are connected by a bus.

The CPU 301 is a processor that performs operation processing, control processing, and the like according to computer programs. The CPU 301 uses a predetermined area of the RAM 302 as a work area and performs various processes in cooperation with computer programs stored in the ROM 303, the storage device 304, and the like.

The RAM 302 is a memory such as a synchronous dynamic random access memory (SDRAM). The RAM 302 serves as a work area for the CPU 301. The ROM 303 is a memory for storing programs and various information in a non-rewritable manner.

The storage device 304 is a device that writes and reads data to and from a semiconductor storage medium such as a flash memory, a magnetically or optically recordable storage medium, or the like. The storage device 304 writes and reads data to and from a storage medium under the control of the CPU 301. The communication interface device 305 communicates with an external device via a network under the control of the CPU 301.

The computer program executed by the computer causes the computer to serve as the control device 34 that controls the communication device 32. The computer program is loaded and executed on the RAM 302 by the CPU 301 (processor).

Furthermore, the computer program to be executed on the computer is recorded and provided on a computer-readable recording medium, such as CD-ROM, a flexible disk, CD-R, and a digital versatile disc (DVD), in a file format installable or executable on the computer.

Furthermore, the computer program may be configured to be provided by being stored on the computer connected to a network such as the Internet and downloaded via the network. Furthermore, the computer program may also be configured to be provided or distributed via the network such as the Internet. Furthermore, the computer program to be executed by the control device 34 may also be configured to be provided by being incorporated in advance into the ROM 303 or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication system configured to change a subcarrier spacing, the wireless communication system comprising:
    a communication device that wirelessly communicates with a plurality of terminal devices;
    a control device that controls wireless communication between the plurality of terminal devices and the communication device; and
    an allocation determination device that generates allocation information indicating a communication block included in a plurality of communication blocks specified by a position in a frequency direction and a position in a time direction, the allocation information being for at least one of the terminal devices,
    wherein:
    the control device determines an allocation time for performing an allocation process by the allocation determination device,
    the control device outputs, to the allocation determination device, an allocation request including information indicating the at least one of the terminal devices, reference information regarding communication of the at least one of the terminal devices, and information regarding the allocation time,
    the allocation determination device:
        to allow the allocation information to be output by a reply time, sets a parameter related to a computation time based on the allocation time, and calculates a solution based on the parameter; and
        outputs the allocation information regarding the at least one of the terminal devices to the control device by the reply time before the allocation time based on the solution, and the control device performs the allocation process before the allocation time based on the allocation information.

2. The wireless communication system according to claim 1, wherein an accuracy of the solution calculated by the allocation determination device based on the parameter increases as the allocation time is later.

3. The wireless communication system according to claim 1, wherein the control device determines the allocation time according to an allowable delay time for wireless communication of the at least one of the terminal devices corresponding to the allocation information.

4. The wireless communication system according to claim 1, wherein each of the communication blocks is a resource element including one subcarrier and one OFDM symbol.

5. The wireless communication system according to claim 1, wherein the control device outputs the allocation request including information regarding allocatable communication blocks, the allocatable communication blocks being a part of the communication blocks out of allocated communication blocks allocated to the terminal devices in an allocatable range including a predetermined number of subcarriers and a predetermined number of OFDM symbols.

6. The wireless communication system according to claim 5, wherein:
    the wireless communication system is configured to change the subcarrier spacing in units of a resource block including the predetermined number of subcarriers and the predetermined number of OFDM symbols,
    the allocation determination device generates the allocation information further indicating a subcarrier spacing of each of one or more resource blocks included in the allocation range, and
    the control device causes the terminal devices and the communication device to wirelessly communicate with each other by using each of the one or more resource blocks included in the allocation range at the subcarrier spacing indicated by the allocation information.

7. The wireless communication system according to claim 1, wherein:
    the allocation determination device generates the allocation information further indicating at least one of reception quality, an orthogonal modulation scheme, a coding rate, and transmission power for each of the communication blocks, and
    the control device causes the terminal devices and the communication device to wirelessly communicate with each other by the orthogonal modulation scheme, the transmission power, and the coding rate indicated by the allocation information.

8. The wireless communication system according to claim 7, wherein:
    the reference information includes communication quality of data transmitted and received in the past by the at least one of the terminal devices, and
    the allocation determination device allocates a target device having high communication quality to a higher coding rate or a higher orthogonal modulation scheme than a target device having low communication quality.

9. The wireless communication system according to claim 1, wherein:
    the communication device wirelessly communicates with each of the terminal devices by using a Massive multiple-input and multiple-output (MIMO) system,
    the allocation determination device generates the allocation information further indicating a propagation channel matrix in the MIMO system for each of the communication blocks, and the control device causes the terminal devices and the communication device to wirelessly communicate with each other by radio waves represented by the propagation channel matrix, in each of the communication blocks.

10. The wireless communication system according to claim 1, wherein:
the reference information includes the allowable delay time for wireless communication of the at least one of the terminal devices, and
the allocation determination device allocates a terminal device having a short allowable delay time to a communication block for which wireless communication is completed at an earlier time than a terminal device having a long allowable delay time.

11. The wireless communication system according to claim 1, wherein the allocation determination device generates the allocation information so as to increase the number of terminal devices capable of performing wireless communication within the allowable delay time among the terminal devices.

12. The wireless communication system according to claim 1, wherein:
the allocation determination device includes a plurality of machine learning models that receive inputting of the information indicating the at least one of the terminal devices, information indicating the communication blocks, and the reference information and output the allocation information,
the machine learning models have different computation times from receiving inputting of information to outputting the allocation information, and
when the allocation request is received, the allocation determination device generates the allocation information by using a machine learning model capable of outputting the allocation information by the reply time among the machine learning models.

13. The wireless communication system according to claim 1, wherein the allocation determination device includes:
a formulation unit that generates the objective function in a quadratic unconstrained binary optimization (QUBO) problem for which the objective function is a quadratic function including a plurality of binary variables;
a solution calculation unit that calculates, as the solution, a solution to the QUBO problem by using a solution device that solves the QUBO problem;
an allocation information output unit that generates the allocation information based on the solution to the QUBO problem and outputs the generated allocation information; and
a setting unit,
each of at least a part of the binary variables included in the objective function corresponds to any of the communication blocks and to the at least one of the terminal devices, and represents whether a corresponding terminal device is allocated to a corresponding communication block, and
the setting unit sets the parameter related to the computation time in the solution device based on the allocation time.

14. The wireless communication system according to claim 13, wherein:
the solution device includes:
an updating unit that alternately updates a first variable and a second variable sequentially for each unit time from an initial time to an end time with respect to each of a plurality of elements with which the first variable and the second variable are correlated; and
an output unit that outputs the solution to the QUBO problem based on the first variable of each of the elements at the end time,
the elements correspond to the binary variables,
each of the first variable and the second variable is represented by a real number,
in an update process for each unit time, the updating unit updates the first variable based on the second variable for each of the elements and updates the second variable based on the first variable for each of the elements,
the output unit calculates a value of a binary variable obtained by binarizing the first variable with a preset threshold value for each of the elements at the end time, and outputs the calculated values of the binary variables as the solution to the QUBO problem, and
the setting unit sets the end time based on the allocation time.

15. The wireless communication system according to claim 1, wherein the allocation determination device sets a processing time in a solution device based on the allocation time so as to output the allocation information by the reply time.

16. A control device that controls wireless communication for a plurality of terminal devices and a communication device included in a wireless communication system configured to change a subcarrier spacing, wherein:
the wireless communication system includes an allocation determination device that generates allocation information indicating a communication block included in a plurality of communication blocks specified by a position in a frequency direction and a position in a time direction, the allocation information being for at least one of the terminal devices,
the control device determines an allocation time for performing an allocation process by the allocation determination device,
the control device outputs, to the allocation determination device, an allocation request including information indicating the at least one of the terminal devices, reference information regarding communication of the at least one of the terminal devices, and information regarding the allocation time,
the allocation determination device:
to allow the allocation information to be output by a reply time, sets a parameter related to a computation time based on the allocation time, and calculates a solution based on the parameter; and
outputs the allocation information regarding the at least one of the terminal devices to the control device by the reply time before the allocation time based on the solution, and
the control device performs the allocation process before the allocation time based on the allocation information.

17. A computer program product having a non-transitory computer-readable medium including programmed instructions stored therein, the instructions, when executed by a computer, controlling the computer to function as:
an information processing device serving as a control device that controls wireless communication for a plurality of terminal devices and a communication device included in a wireless communication system configured to change a subcarrier spacing,
wherein:
the wireless communication system includes an allocation determination device that generates allocation information indicating a communication block included in a plurality of communication blocks specified by a position in a frequency direction and a position in a time direction, the allocation information being for at least one of the terminal devices, the control device determines an allocation time for performing an allocation process by the allocation determination device, the control device outputs, to the allocation determination device, an allocation request including information indicating the at least one of the terminal devices, reference information regarding communication of the at least one of the terminal devices, and information regarding the allocation time, the allocation determination device;
- to allow the allocation information to be output by a reply time, sets a parameter related to a computation time based on the allocation time, and calculates a solution based on the parameter; and
- outputs the allocation information regarding the at least one of the terminal devices to the control device by the reply time before the allocation time based on the solution, and the control device performs the allocation process before the allocation time based on the allocation information.

* * * * *